Feb. 22, 1955 G. E. ROWE 2,702,444
APPARATUS FOR FORMING GLASSWARE
Filed July 9, 1949 12 Sheets-Sheet 1

INVENTOR
GEORGE E. ROWE

BY Parham + Bates
ATTORNEYS

Feb. 22, 1955  G. E. ROWE  2,702,444
APPARATUS FOR FORMING GLASSWARE
Filed July 9, 1949  12 Sheets-Sheet 2

INVENTOR
GEORGE E. ROWE

BY Parham + Bates
ATTORNEYS

Feb. 22, 1955  G. E. ROWE  2,702,444
APPARATUS FOR FORMING GLASSWARE
Filed July 9, 1949  12 Sheets-Sheet 4

INVENTOR
GEORGE E. ROWE
BY *Parham + Bates*
ATTORNEYS

Feb. 22, 1955 — G. E. ROWE — 2,702,444
APPARATUS FOR FORMING GLASSWARE
Filed July 9, 1949 — 12 Sheets-Sheet 5
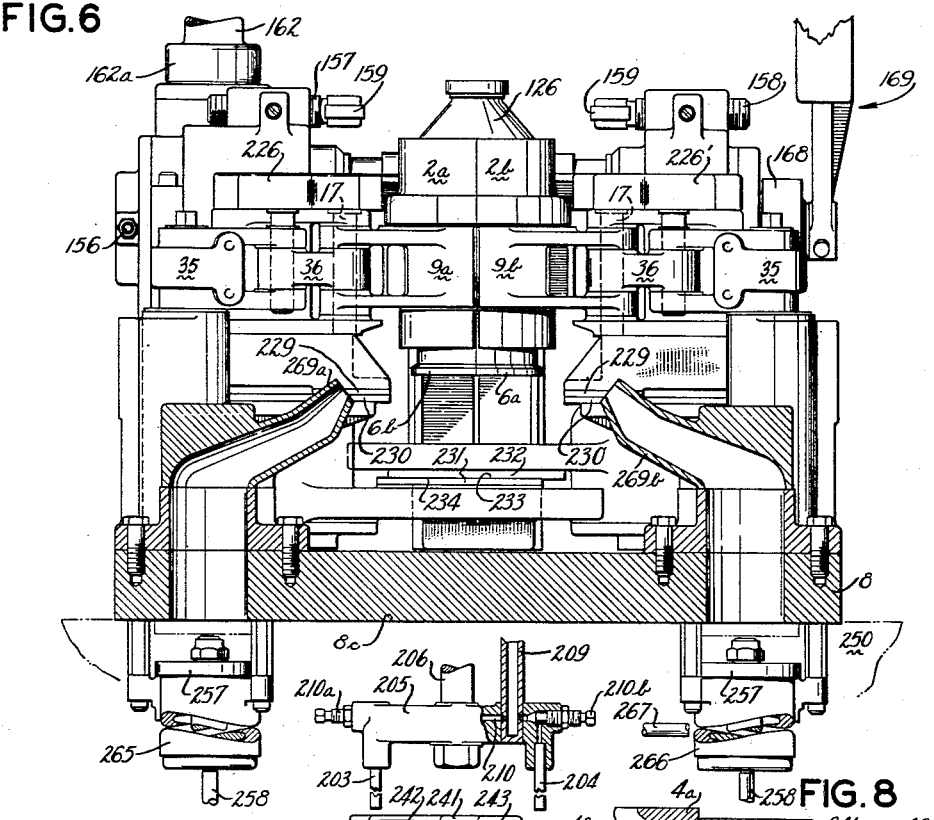
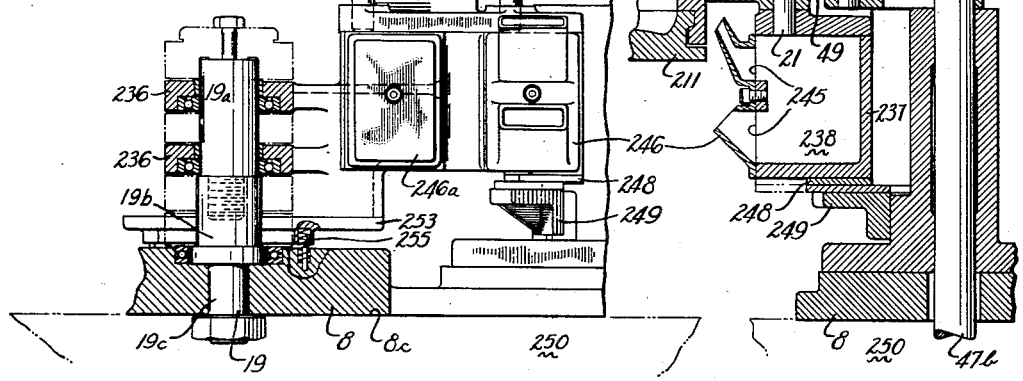
INVENTOR
GEORGE E. ROWE
BY Parham & Bates
ATTORNEYS Feb. 22, 1955 G. E. ROWE 2,702,444
APPARATUS FOR FORMING GLASSWARE
Filed July 9, 1949 12 Sheets-Sheet 6
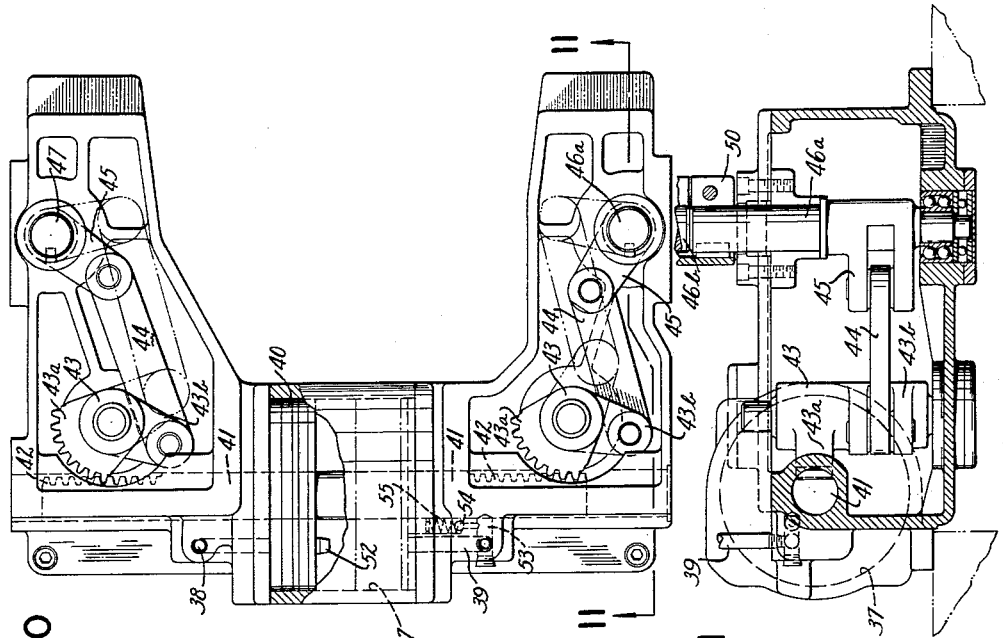
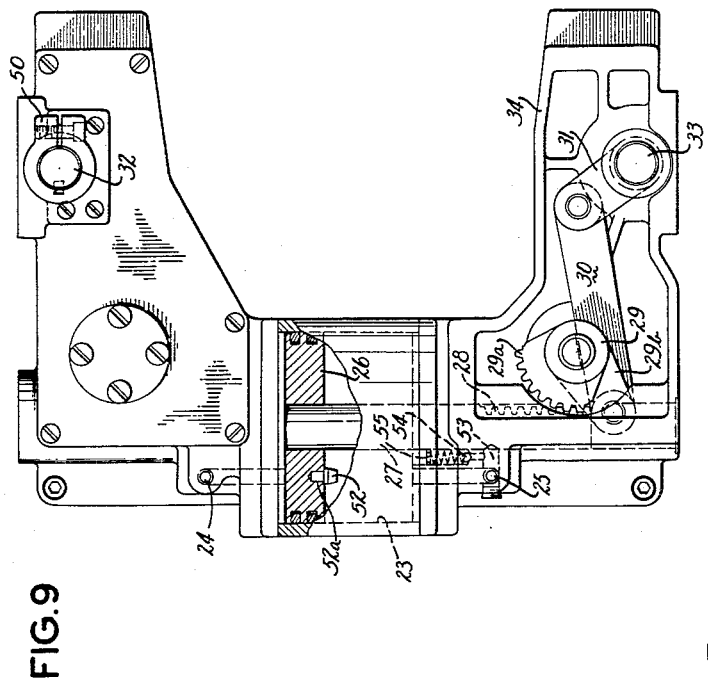
INVENTOR
GEORGE E. ROWE
BY Parham + Bates
ATTORNEYS

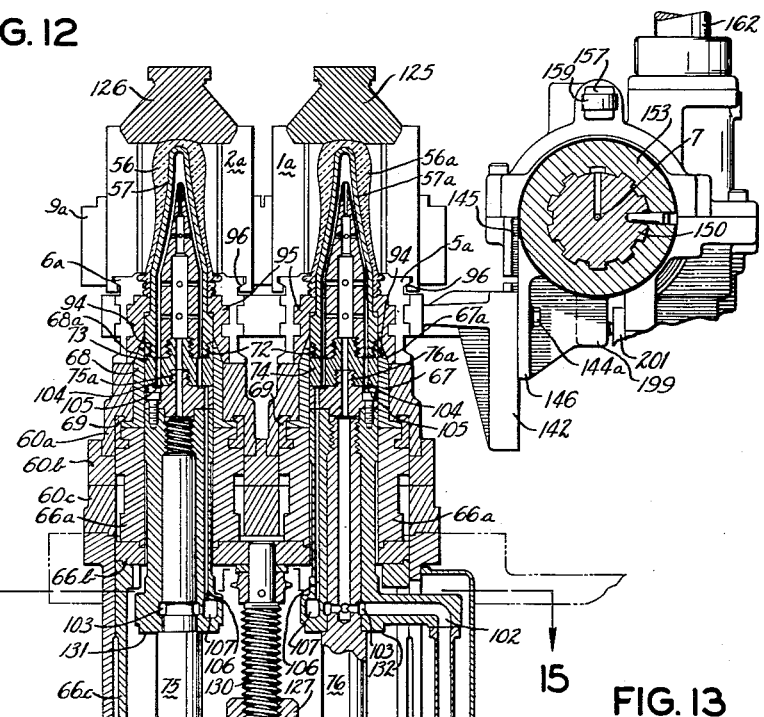
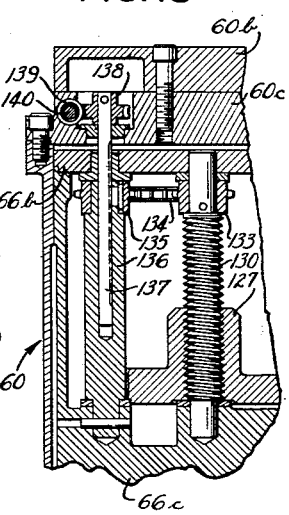
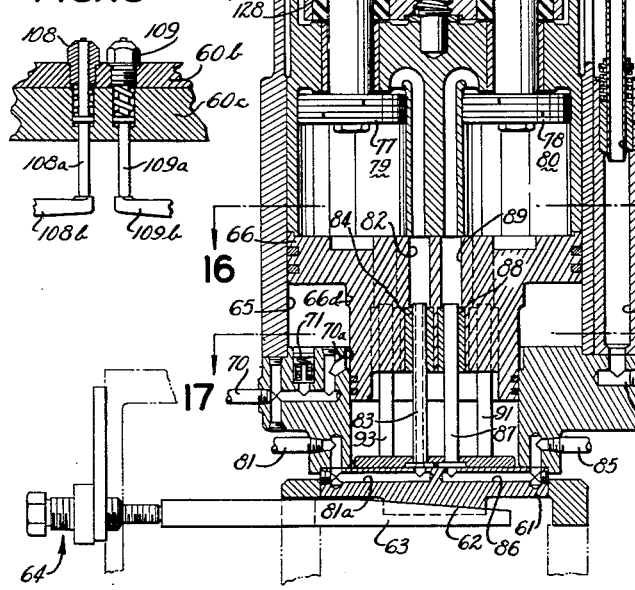

Feb. 22, 1955 G. E. ROWE 2,702,444
APPARATUS FOR FORMING GLASSWARE
Filed July 9, 1949 12 Sheets-Sheet 8

INVENTOR
GEORGE E. ROWE
BY Parham + Bates
ATTORNEYS

Feb. 22, 1955
G. E. ROWE
2,702,444
APPARATUS FOR FORMING GLASSWARE
Filed July 9, 1949
12 Sheets-Sheet 9
FIG. 19
FIG. 20
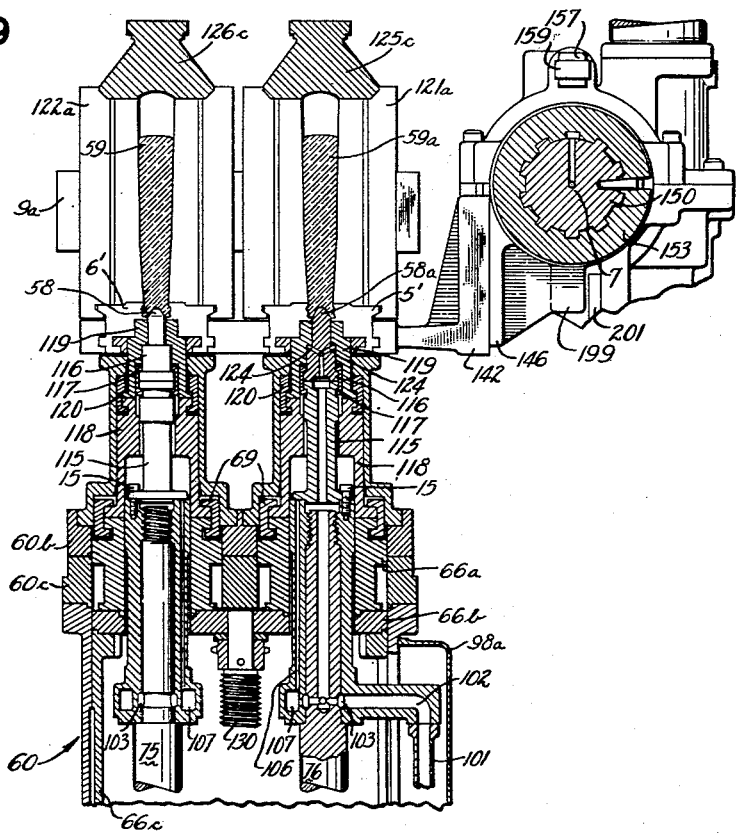
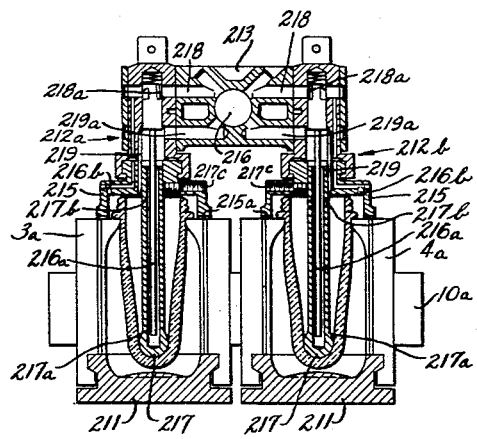
INVENTOR
GEORGE E. ROWE
BY *Parham + Bates*
ATTORNEYS Feb. 22, 1955

G. E. ROWE 2,702,444

APPARATUS FOR FORMING GLASSWARE

Filed July 9, 1949

INVENTOR
GEORGE E. ROWE

BY Parham + Bates
ATTORNEYS

Feb. 22, 1955     G. E. ROWE     2,702,444
APPARATUS FOR FORMING GLASSWARE
Filed July 9, 1949     12 Sheets-Sheet 11
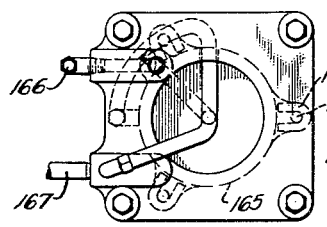
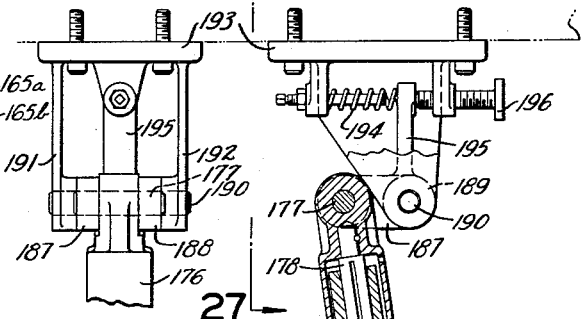
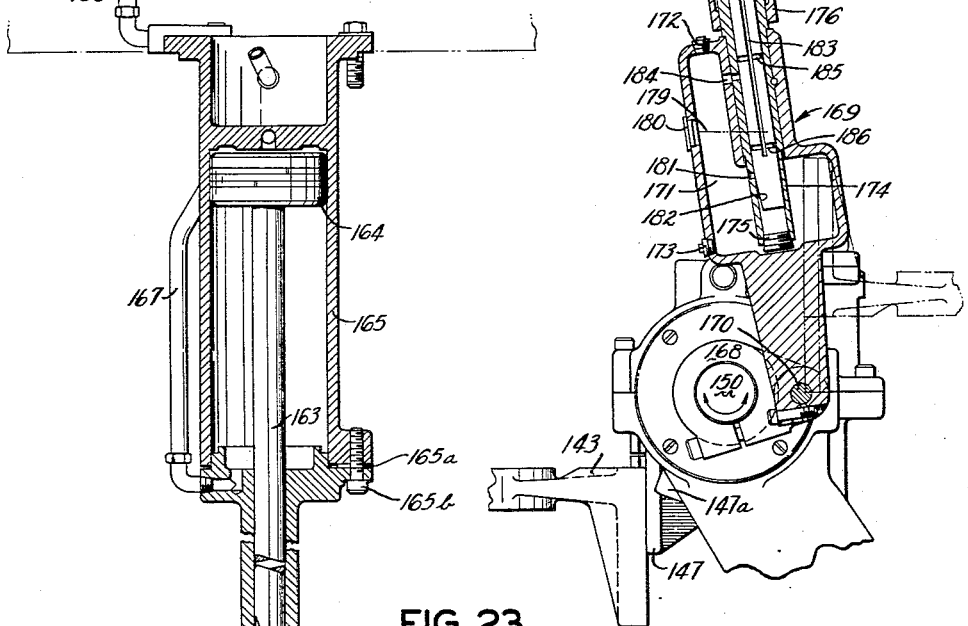
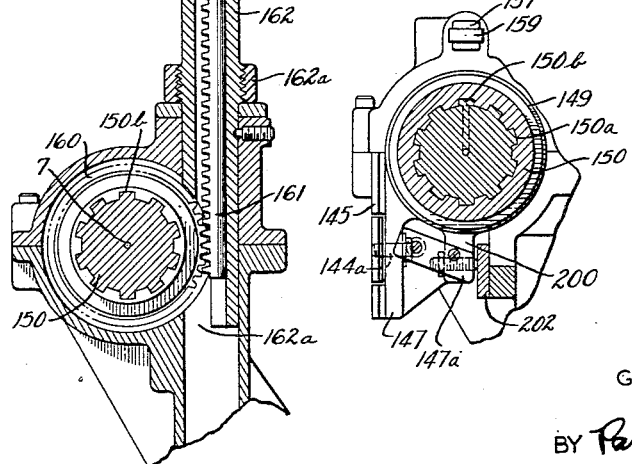
INVENTOR
GEORGE E. ROWE
BY Parham & Bates
ATTORNEYS Feb. 22, 1955  G. E. ROWE  2,702,444
APPARATUS FOR FORMING GLASSWARE
Filed July 9, 1949  12 Sheets-Sheet 12

INVENTOR
GEORGE E. ROWE

BY Parham & Bates
ATTORNEYS

United States Patent Office 2,702,444
Patented Feb. 22, 1955

2,702,444

APPARATUS FOR FORMING GLASSWARE

George E. Rowe, Wethersfield, Conn., assignor to Emhart Manufacturing Company, a corporation of Delaware Application July 9, 1949, Serial No. 103,903

18 Claims. (Cl. 49—9)

The present invention relates to the manufacture of glassware, and has particular relation to the production of blown glassware by forming machinery in which blanks or parisons are formed in blank molds, transferred to finishing molds and are there blown into final shape.

A general object of the invention is to provide an improved mold supporting, locating and operating mechanism in a glassware forming machine of the type indicated.

A more specific object is to provide a mechanism of the type indicated including means for supporting and simultaneously opening and closing a plurality of blank molds and blow molds, and individually controlled means associated with each blank mold cavity for forming a glass preform or blank in one mold independently of the formation of blanks in the other molds, and controlled means associated with each blow mold cavity with which to form the blanks into finished ware in the blow molds.

A further object is to provide, in an automatic glassware forming machine section having a plurality of simultaneously operable blank molds and simultaneously operable associated blow molds together with operable forming means associated with each mold, means for discontinuing the operation of the forming means associated with one blank mold without discontinuing the operation of the forming means associated with another blank mold, whereby the machine may be selectively operated as a plural and as a single cavity section.

Another object is to provide a feeder fed glassware forming machine having blank and blow molds for selectively forming glassware by blow-and-blow and by press-and-blow including an operable plunger carrier for selectively supporting a neck pin and pressing plunger and wherein the carrier has means for selectively raising and lowering the neck pin to receive and counterblow a charge of glass and for raising and lowering the plunger to press a charge in the blank mold.

A further object is to provide a blank and blow mold forming machine section of the type indicated for operating selectively, single and plural pairs of blank and blow molds to form either single or plural glass articles during a single blank and blow operating cycle of the section.

Another object is to provide, in combination with mechanism including a neck ring mold for transferring the glassware from a blank mold to a blow mold, blank and blow mold supporting and operating mechanism which is self-compensating for expansion and contraction caused by variations in the temperature of the transfer and mold supporting mechanisms so that accurate alignment of the neck ring mold relative to both the blank and blow molds is obtained.

Still another object is to provide means to stretch and center the blank or parison in the blow mold and to support the blank adjacent both ends against sway by mechanical means preparatory to and during the blowing operation in the blow mold.

Still another object is to provide means to pivotally support blank and blow mold holder arms on a common pivot axis located adjacent the pivot axis of the mechanism for inverting and transferring the glassware between the blank and blow molds.

Still another object is to provide means to swing the blank and blow mold holder arm about a common axis located on a common parting line for the blank and blow molds, and on the blow mold side and underneath the transfer-invert pivot axis so that the blow mold holder arms are shorter than the blank mold holder arms.

A further object is to provide means to support the weight of the molds and loads placed thereon during glassware forming operations beneath and along the line of the load, so that the hinge pin assembly, which is located at a distance from and out of line with the direction of the mold load, serves merely as a locating point and is relieved of loads which might otherwise disturb the proper location of the molds.

A further object is to provide a novel cooling system for controlling the temperature of various parts of the forming machine, especially the blank, blow and neck ring molds.

More particularly, it is an object of the invention to provide hollow mold holder arms for receiving cooling air from a common air chest and provide timer controlled valve means for individually regulating the air supplied through each arm to the mold sections supported thereby.

Still another object is to provide means for regulably controlling the amount of cooling air to the neck ring molds and from each holder arm to the supported molds.

Another object is to provide means for regulably and accurately controlling the extreme positions of the transfer-invert and its neck ring molds relative to the blank and blow molds, and the acceleration and deceleration of the transfer to and from those positions.

Still another object is to provide means to apply the force for opening and closing each mold holder arm centrally relative to the mold section or sections supported by the arm and to apply the closing pressure in substantially a straight line at right angles to the mold parting line.

A further object is to provide improved and simplified means for readily adapting the mold holder and the transfer-invert arms for either single or multiple mold operation as desired.

Other objects and advantages of the invention will be apparent from the reading of the following description and claims and the accompanying drawings to which reference is made and in which:

Fig. 6 is a cross sectional view taken on line 6—6 of Fig. 1 showing details of the blank mold operating mechanism and nozzles for directing cooling air against the neck ring molds.

Fig. 7 is a cross-sectional view taken on line 7—7 of Fig. 1 showing a baffle plate for regulating the cooling air to an outboard blow mold section and a capping plate for the inboard cooling air outlet when the machine is single gob operation;

Fig. 8 is a cross-sectional view taken on line 8—8 of Fig. 1;

Fig. 9 is a plan view of a housing partially broken away and with one cover plate removed within which is located the operating cylinder and linkage for actuating the blank mold drive shafts which open and close the blank mold arms;

Fig. 10 is a view similar to Fig. 9 of the cylinder and operating linkage for operating the blow mold operating shafts;

Fig. 11 is a cross-sectional view taken on line 11—11 of Fig. 10;

Fig. 12 is a cross-sectional view of the pressing plunger mechanism, a portion of which is shown in Fig. 2;

Fig. 13 is a partial cross-sectional view taken on line 13—13 of Fig. 14 showing details of the adjustable mechanism for regulating the stroke of the pressing plungers and neck pins;

Fig. 18 is a cross-sectional view taken on line 18—18 of Fig. 14;

Fig. 19 is a cross-sectional view similar to Fig. 12 showing neck pins substituted for the pressing plungers of the latter view and the operating mechanism adapted for blowing rather than pressing of preforms;

Fig. 20 is a view of the blow heads preparatory to a blowing operation in the blow molds;

Fig. 23 is a cross-sectional view taken on line 23—23 of Fig. 21;

Fig. 24 is a cross-sectional view taken on line 24—24 of Fig. 22 showing mechanism for inverting the neck ring mold holder assembly;

Fig. 25 is a top view of the invert mechanism shown in Fig. 24;

Fig. 26 is a cross-sectional view of an invert snubber cylinder assembly;

Fig. 27 is a view taken on line 27—27 of Fig. 26 showing details of the top of the snubber assembly.

Figure 1:
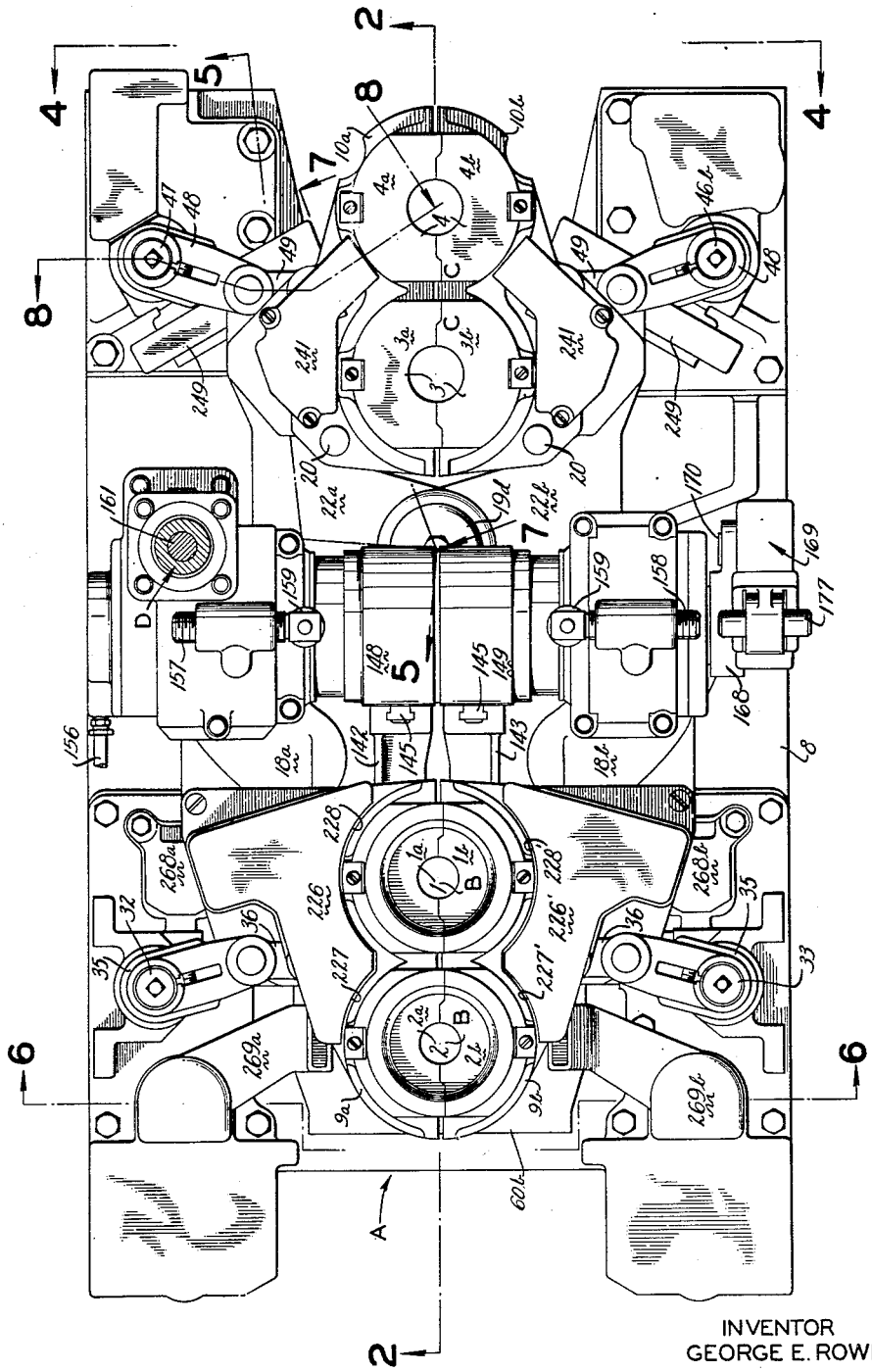
Fig. 1 is a plan view taken substantially on the line 1—1 of Fig. 4 showing a glassware forming machine which constitutes a preferred embodiment of the present invention, and which includes a pair of blank and a pair of blow molds.

A glass working apparatus embodying mechanical aspects of the present invention is illustrated in the accompanying drawings and, in general, comprises a single shaping machine or individual section A (Fig. 1), including a suitable base and frame structure, having a pair of blank or parison molds operable at a blank or parison forming station B and a pair of blow molds operable at a blow mold station C. Each blank and blow mold is provided with associated forming mechanism and is capable of independently performing a complete glass fabricating operation at its station.

Although not shown in the drawings, suitable means, such as shown in the copending application, Serial Number 144,420 filed February 16, 1950, which issued as Patent No. 2,669,805, February 23, 1954, are provided for delivering formed mold charges or gobs of predetermined size and shape selectively to one or both blank molds of section A. In addition, suitable automatic take-out mechanism (not shown) preferably is provided for transferring the finished ware from station C to a conveyor for further treatment or handling.

Figure 28:
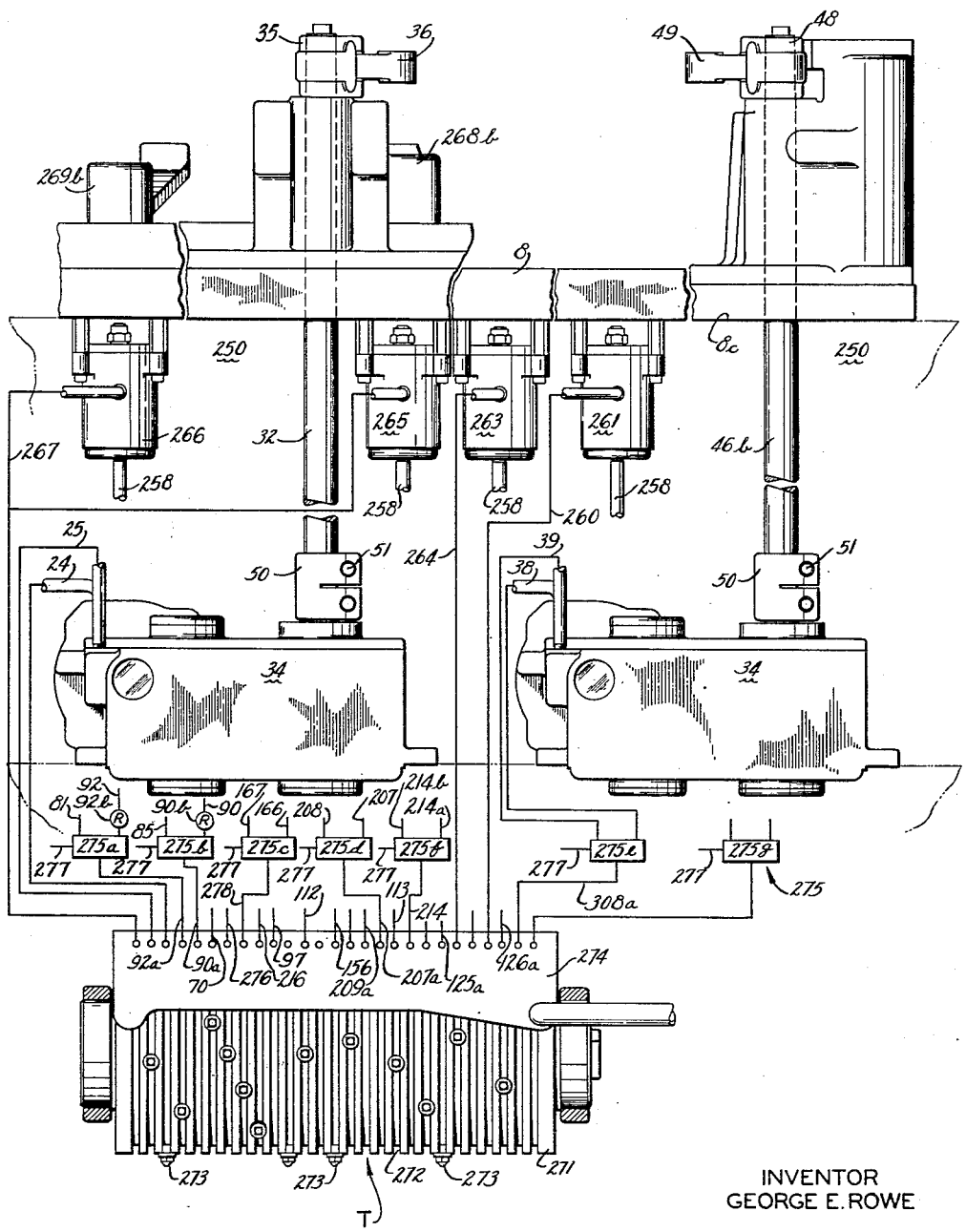
Fig. 28 is a partially diagrammatic view, portions of which are broken away, showing a timer and its air lines for controlling the operation of the components and mechanisms shown in Figs. 1 to 25, inclusive.

The section A also includes a device D for transferring the preforms or parisons from the blank mold station B to the blow mold station C; and a timer control mechanism T for regulating the opening and closing of the molds and for individually regulating application of operating fluid pressure to the forming mechanism associated with each mold and cooling air discharged at stations B and C against the neck, blank and blow molds (Fig. 28).

Provision is made for discontinuing the operation of the forming mechanisms associated with one pair of blank and blow molds without discontinuing the operation of the mechanisms associated with the other pair of molds whereby the section A may be selectively adopted for single gob as well as double gob operation without interchanging its components. The section further includes permanent actuating mechanism for interchangeable forming members with which the blank molds may be selectively adapted for blow-and-blow and press-and-blow operation of the section.

These several mechanisms, constructions and components are described hereinafter in greater detail.

General construction of section A

While only the single section A of a gob fed glassware forming apparatus is illustrated in the drawings, it will be understood that, in actual practice, it is contemplated that a plurality of the individual sections A will constitute a forming machine. An example of a plural section forming machine embodying the present invention is illustrated and described in the applicants copending application, Serial Number 144,420 filed February 16, 1950. The subject matter claimed in the latter application, including the location of the several sections relative to one another and to a feeder, does not constitute a part of the present invention.

Referring to the drawings, the forming machine section A is provided with a pair of blank or parison molds 1 and 2 which are disposed in permanently inverted positions at the blank forming station B (Fig. 1); a pair of blow molds 3 and 4 which are permanently disposed in neck-up positions at the finish blowing station C; and a pair of neck ring molds 5 and 6 (Fig. 2) which are adapted to be swung about a horizontal axis 7 from the blank forming station B to the finish blowing station C and to transfer blanks or parisons from the blank or parison molds 1 and 2 to the blow molds 3 and 4 while, at the same time, inverting the blanks or parisons from their initial neck-down positions at the station B to neck-up positions at station C.

In connection with the alternative description of the preform molds 1 and 2 as "blank" or "parison" molds, it should be explained that the former term is intended to designate preforms made in the press-and-blow process, and the latter to designate the preform made in the blow-and-blow process. Hereinafter, when both of the terms are employed in the same sentence or claim, it is intended that this distinction be recognized. However, when the term "blank" stands alone and apart from any mention of "parison," it is intended to signify any preform regardless of whether it is made by the press-and-blow or the blow-and-blow process.

The molds 1, 2, 3 and 4 and the oscillating neck ring molds 5 and 6 are carried by a structure consisting of a rigid base structure generally designated 8, which is preferably relatively heavy so as to provide a firm support for the various operating parts, and on which is mounted the drive and forming mechanism and associated parts of the molds. Although stationary in the embodiment illustrated, the base may be mounted on a rotatable turret or table if desired.

Blank and blow mold construction

The blank molds 1 and 2 each comprises two halves or sections 1a, 1b and 2a, 2b (Fig. 1), the sections of each mold meeting on a common irregular parting plane, suitable interlocking joints being provided to assure bringing the mold sections into correct registry when closed. The blow molds 3 and 4, similarly, each comprises sections 3a, 3b and 4a, 4b which meet on the common parting plane of the blank molds. The parting surface, except for the irregularities of conventional aligning offsets, defines a vertical plane through the axes of the several molds and at right angles to the invert-transfer axes 7 as shown in Figs. 2 and 12.

Securing molds in holders

Figure 2:
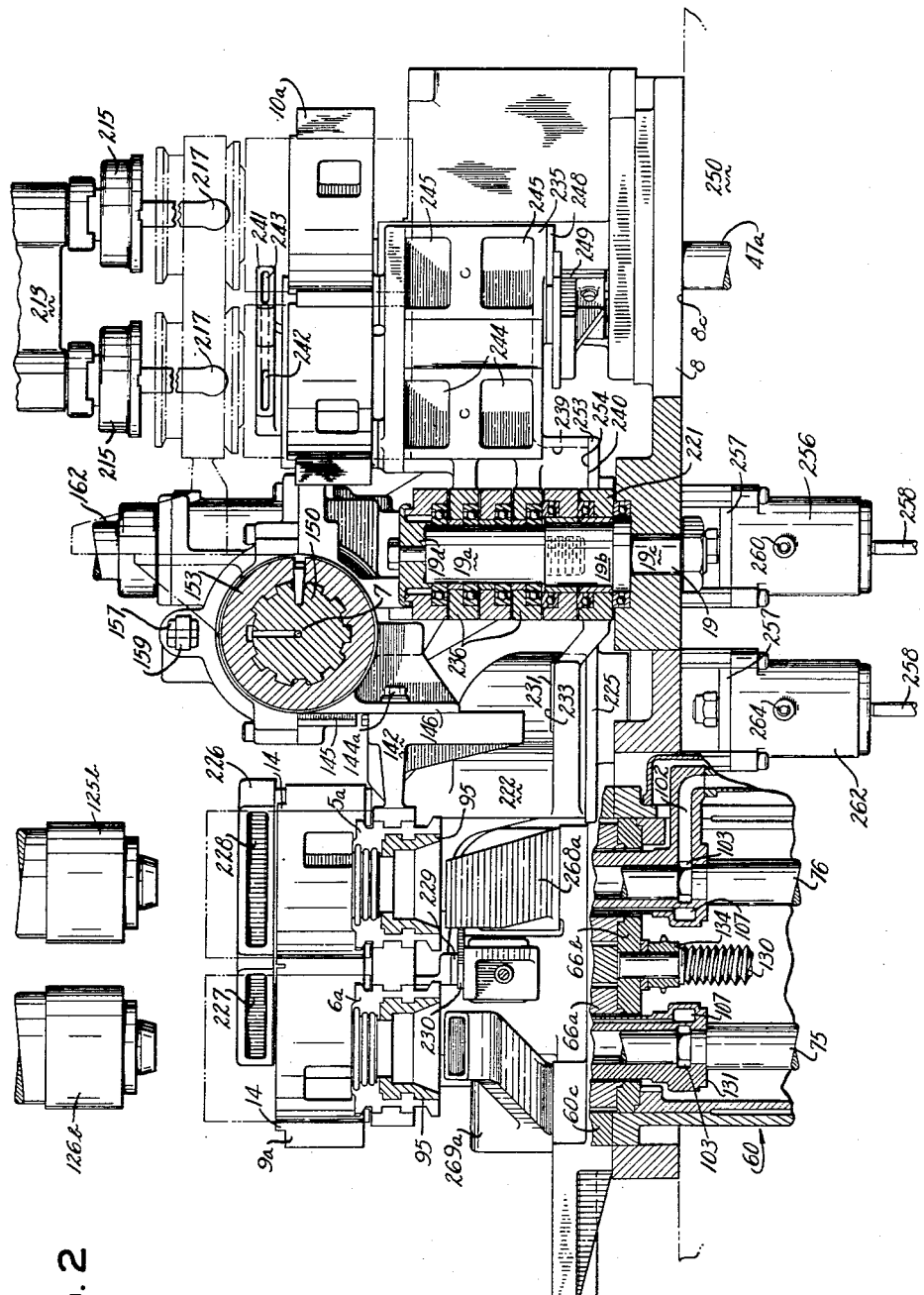
Fig. 2 is a cross-sectional view taken on line 2—2 of Fig. 1 showing details of the blank and blow mold operating and cooling structure, a portion of the pressing plunger mechanism on the blank mold side being broken away to show the neck ring cooling nozzles clearly.

As shown in Figs. 1, 2 and 6, the blank mold halves or sections 1a and 2a in their inverted positions are detachably secured to a mold holder 9a and the mold sections 1b and 2b similarly are secured to a mold holder 9b.

Figure 4:
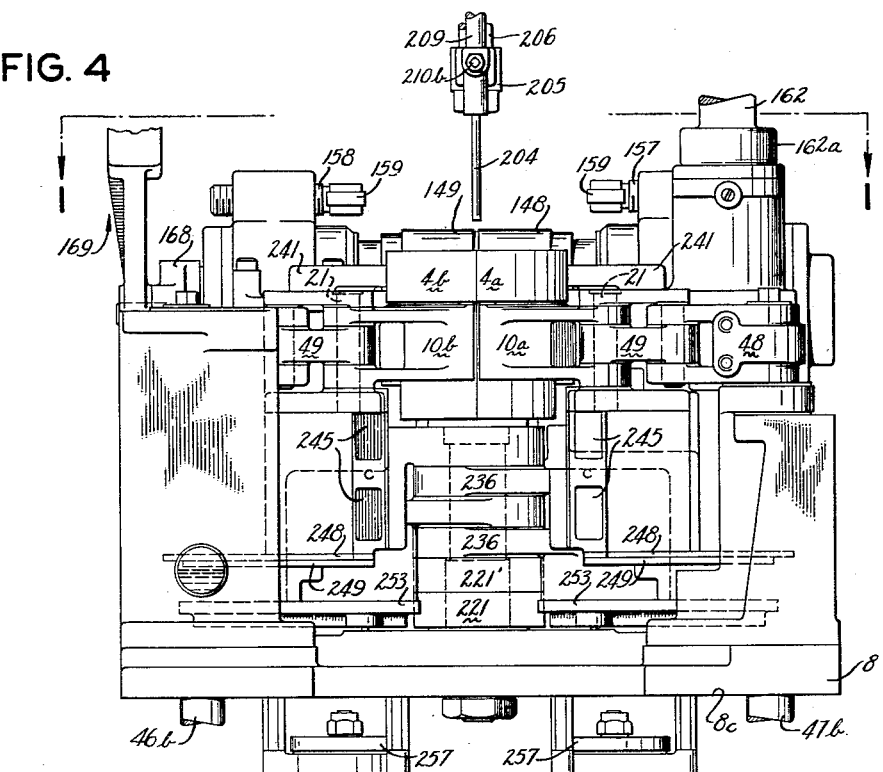
Fig. 4 is a front elevation taken substantially on line 4—4 of Fig. 1 with puff-blow mechanism added.

Likewise, as shown in Figs. 1, 2 and 4, each of the blow mold halves 3a, 3b, 4a and 4b are secured upright in similar holders 10a and 10b. A simple engagement of the parts is employed so that it is only necessary to lift each mold section vertically upward from its holder to remove the section. Fig. 8 illustrates such an engagement of the parts, wherein the mold holder 10a is provided with a semi-annular upwardly extending rib 11 which engages beneath an outer peripheral shoulder portion 12 of the associated mold section 4a, and a substantially semi-annular downwardly extending lip 13 is received behind the rib 11 on the holder, clearance being provided to permit limited floating movement of the mold section.

As shown in Fig. 1, the blank mold sections 1 and 2 are secured in like manner to the holder 9a and 9b. Each holder 9a, 9b, 10a, and 10b also may be provided with recesses 14 (Fig. 2) which are adapted to receive conforming projections on the mold sections and prevent the sections from being accidentally rotated relative to, or otherwise dislodged from, their mold holders.

Figure 3:
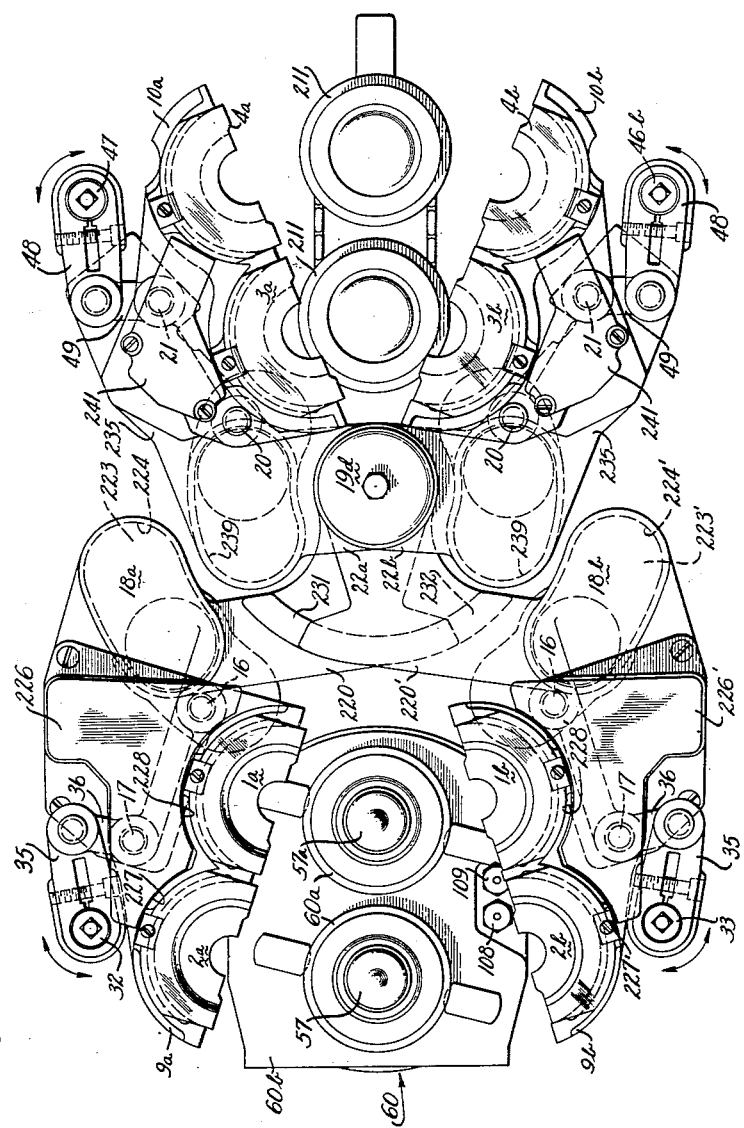
Fig. 3 is a plan view of the blank and blow molds in their open positions.

As shown in Figs. 3 and 6, the blank mold holders 9a and 9b are detachably secured by studs 16 and 17 to a pair of irregularly shaped holder arms 18a and 18b, which hereinafter are described in greater detail in describing the mold cooling means. The arms 18a and 18b are pivotally mounted on a vertical shaft generally designated 19 (Fig. 2). The blow mold holders 10a and 10b similarly are detachably secured by studs 20 and 21 (Figs. 3, 4 and 8) to mold holder arms 22a and 22b which are pivotally supported on the same vertical shaft 19 which, as shown in Fig. 1 is located somewhat nearer the blow mold station C than the blank mold station B.

Automatic self-alignment of the mold holders 9a, 9b, and 10a, 10b and the sections of the closed molds 1, 2, 3 and 4, is obtained by whiffle-securing the mold holders to their mold holder arms 18a, 18b, 22a and 22b. More particularly, the holders are pivotally secured to the studs 16 and 21 and permitted limited pivotal movement thereon by the sloppy fit on the studs 16 and 20 of oversized holes in the holders.

It has been found desirable to make the pin 19 in two sections 19a and 19b to facilitate removal and replacement of the blow mold holders arms 22a and 22b independently of the blank mold holder arms 18a and 18b. As shown in Fig. 2 the lower end 19c of the bottom section 19b, which pivotally supports the blank mold arms 18a and 18b, is detachably fastened to the base plate 8, and the upper section 19a, which pivotally supports the blow mold arms 22a and 22b, is threaded or otherwise detachably secured firmly in the upper end of the lower section 19b. The assembled arms may be secured on the shaft 19 by a detachable cap 19d.

Although not shown in the drawings, the mold holder arms 9a, 9b, 10a and 10b may be provided with conventional means, such as adjustable stop bolts, for limiting the movement of the arms and opening of the molds to a predetermined fully open position (Fig. 3).

*Mold opening and closing mechanism*

The blank molds 1 and 2 are opened and closed by a fluid pressure actuated motor which includes an air cylinder 23 (Fig. 9) to the opposite ends of which air is admitted and exhausted through lines 24 and 25 from an air chest and valve controlling timer mechanism, generally designated T (Fig. 28). The cylinder 23 contains a piston 26 having a double ended piston rod 27, the ends of which have racks as at 28 for engaging segment gear arms 29a of a pair of bell cranks 29, only one of which is shown in Fig. 9. The other arms 29b of the bell cranks 29 are connected by links 30 with crank arms 31 which are secured to vertically disposed and rotatably journaled shafts 32 and 33, the rotation of which serves to open (Fig. 3) and close (Fig. 1) the respective mold holder arms 18a and 18b and the mold sections which they carry.

Preferably the bell cranks 29, links 30 and crank arms 31 are sealed in oil within a housing 34 located at the bottom of the section frame 8. The two shafts 32 and 33 extend upwardly through the frame (Fig. 28) and have secured to their upper ends, crank arms 35 which are connected by toggle links 36 to the studs 17 (Figs. 3 and 6) on the arms 18a and 18b.

Similarly, as shown in Figs. 10 and 11, there is provided a second or blow mold opening and closing cylinder 37 to the opposite ends of which air pressure is alternately admitted and exhausted through lines 38 and 39 under the control of the timer T (Fig. 28).

The cylinder 37 contains a piston 40 having a double ended rod 41, the ends of which have racks 42 which engage segment gear arm 43a of bell cranks 43. Arms 43b of the bell cranks 43 are connected by links 44 with crank arms 45 which are keyed to vertically disposed and rotatably journaled shafts 46 and 47, rotation of which effects opening and closing of the blow mold holder arms 22a and 22b. The two shafts 46 and 47 extend upwardly through the frame (Fig. 28) and have secured to their upper ends crank arms 48 which are connected by toggle links 49 to the studs 21 on the arms 22a and 22b (Figs. 3, 4, and 8).

Preferably each shaft 32, 33, 46 and 47 has two sections. Shafts 46 (Fig. 28) is illustrative of the two-section construction. The two sections 46a and 46b are keyed in a coupling 50 (Fig. 11) and secured as by means of suitable tightening bolts 51 so that the upper end 46b may be removed without disturbing the lower end 46a. The crank arms, 35 and 48 may be angularly adjusted on their shafts to provide for wear and readjustment of the open and closed positions.

As best shown in Fig. 3, the cranks 35 and 48 and the links 36 and 49, respectively, which connect each of them with their associated mold holder arms 18a, 18b, 22a and 22b, preferably are arranged so that each connected crank and link hold the molds closed as a substantially closed or unbreakable toggle. It also is preferable, as shown in Fig. 3 to locate each of the studs 17 and 21 at points approximately midway between each pair of blank and below molds 1, 2 and 3, 4 and to locate the mold opening and closing shafts 32, 33 and 46, 47 so that the substantially closed toggles formed by the cranks 25 and 48 with their respective toggle links 36 and 49 are disposed generally at right angles to the parting line of the closed molds.

In order to cushion the opening of the molds 1, 2 and 3, 4 the piston 26 (Fig. 9) and the piston 40 (Fig. 10) each may be provided with a taper plug 52 secured as by the friction fit of its shank 52a in a suitable aperture in the piston, the plug 52 associated with the piston 26 being in alignment with the passage 25 and the plug 52 associated with the piston 40 being in alignment with the passage 39 so as to limit the exhaust of fluid pressure from the cylinders as the taper plugs 52 approach and enter the passages and the mold arms approach their fully opened positions.

It is desirable to start the movement of the pistons 26 and 40 in the opposite direction at high speeds, and accordingly a separate air inlet passage 53 connects the cylinders 23 and 37 with their respective passages 25 and 39 and each contains a check valve member 54 (Figs. 10 and 11) pressed on its seat by a suitable resilient means, such as the spring 55.

Air admitted through passage 25 moves the check valve 54 off of its seat and passes directly to the space below the piston 26, as seen in Fig. 9. As soon as the plug 52 is moved out of the passage 25, a full and wholly uninterrupted passage of air may be admitted to the cylinder thus moving the piston to the opposite end of its stroke. On the return movement of the piston, downward as seen in Fig. 10, the check valve 54 will be closed during the exhausting of the air below the piston, and the piston will move at substantially its full speed until the taper plug 52 enters the passage 25. The exhaust will then be checked materially, forming an air cushion in front of the piston which will effectively retard its movement to the end of its stroke, and at the same, the tapered shape of the plug 52 will permit the air of this cushion to leak out, thus permitting the piston to reach the extreme end of its stroke impelled by pressure admitted to the opposite end of the cylinder through the line 24.

The action of the piston 40 in cylinder 37 (Fig. 10) is, of course, similarly affected by the like taper plug 52 and check valve 54 associated with it. Preferably all of the pistons and cylinders used in the machine are provided with similar check and fast opening valves to cushion and prevent jarring of the parts in the manner indicated.

*Gob delivery to the blank molds*

Glass charges or gobs may be delivered to the blank molds 1 and 2 from the feeding means by a delivery means, the particular type being immaterial to the present invention. In practice, the delivery mechanism illustrated in the aforementioned copending application, Serial Number 144,420, has proved satisfactory and is preferred.

*Pressing plunger operating and interchangeable neck pin counterblowing mechanism*

As shown in Fig. 12, the glass charges are formed in the molds 1 and 2 into preforms or blanks 56 and 56a by two pressing plungers 57 and 57a, improved mechanism being provided for operating them as the first part of a press-and-blow forming cycle.

The present invention also provides for the same operating mechanism being employed to operate a pair of neck pins 58, 58a for forming the internal neck finish and to counterblow glass charges into a pair of parisons 59, 59a (Fig. 19), as the first part of a blow-and-blow forming cycle.

Referring more particularly to Fig. 12, the operating mechanism includes a vertically disposed generally cylindrical housing 60 mounted below and generally in alignment with the pair of blank molds 1 and 2. Suitable provision is made for effecting vertical adjustment of the housing 60 as, for example, by providing its lower end with an adjusting head plate 61 having an inclined lower surface 62 which is adapted to be moved vertically by a horizontally movable wedge 63. Advancement and retraction of the wedge 63 to raise or lower the housing 60 a regulable amount is effected by a bolt and nut adjustment assembly generally designated 64. The housing 60 carries superstructure shown at 60a, 60b and 60c.

The interior of the housing 60 is provided with a vertically disposed cylindrical bore 65 in which is located a piston 66 having superstructure 66a, 66b and 66c to the upper end of which a pair of thimble members 67, 68 are removably secured, as by means of split rings 69. The thimbles 67 and 68, respectively, are axially aligned with the blank molds 1 and 2 and may be moved into engagement with the neck ring molds 5 and 6 by air or other fluid medium which is supplied under pressure through a line 70 into the bottom of the cylinder 65 to raise the piston 66 to the position shown in Fig. 12. While fluid pressure or other means such as springs may be employed, in the present embodiment, when the pressure in line 70 is relieved, gravity returns the piston 66 to the bottom of cylinder 65 thus retracting the thimbles. An annular shoulder portion 66d of the piston chokes the exhaust of fluid from the bottom of the cylinder through portion 70a of line 70 and cushions the end of the piston's downstroke. A check valve 71 permits prompt flow of the pressure medium from line 70 to the cylinder so that the choked passage 70a does not delay the prompt upward stroke of the piston 66 from its retracted position.

As shown in Fig. 12, the plungers 57 and 57a are detachably secured, as by threads 72, to the upper ends of a pair of sleeves 73 and 74 that are themselves secured on the threaded upper ends 75a and 76a of a pair of piston rods 75 and 76, the lower ends of the rods being secured to a pair of pistons 77 and 78 operably mounted in cylindrical bore portions 79 and 80 of the piston 66. As thus mounted, the plungers 57 and 57a are axially aligned with and guided by their respective thimbles 67 and 68 as they are raised and lowered by the pistons 77 and 78.

In the illustrated embodiment, the pistons 77 and 78 and the plungers 57 and 57a which they respectively operate are independently raised and lowered by air pressure. More particularly, the air pressure for retracting the piston 77 is supplied by a pipe line 81 and introduced into the upper end of the cylinder 79 through a passage 81a in the bottom plate 61 and a passage 82 in the piston 66, the passages 81a and 82 being connected through a supply pipe 83 and a packing gland 84 which permit movement of the piston 66 without interrupting the air supply. Similar components are provided for retracting the piston 78 including pipe line 85, passage 86, pipe 87, gland 88 and passage 89.

Figure 17:
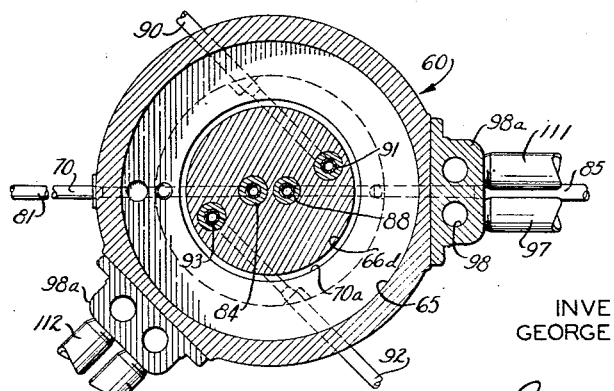
Fig. 17 is a cross-sectional view taken on line 17—17 of Fig. 12.

Air pressure is introduced from a line 90 (Fig. 17) upwardly through pipe 91 (Fig. 12) into the bottom of cylinder 80 to raise the piston 78 and move the plunger 57a upwardly within the outer thimble 67 to its pressing position. Similarly, air is introduced from a line 92 (Fig. 17) upwardly through pipe 93 (Fig. 12) into the cylinder 79 to raise the piston 77 and move the plunger 57 to its upper or pressing positions within the thimble 68.

Referring more particularly to the thimble 67, it is conically tapered as at 67a so as to be self-centering with a conforming conical recess 94 in an inset 95 carried by the neck ring mold 5. The inset 95 and the two halves of the neck ring mold halves 5a and 5b are provided with sufficiently deep flanges and cooperating recesses so that the inset 95 is loosely supported when the neck ring mold halves are open and firmly secured and centered when the neck ring mold is closed. The self-centering of the thimble relative to the closed neck ring mold 5 serves to center the pressing plunger 57a relative to the neck ring mold 5 and the blank mold 1, the latter being centered relative to the neck ring by a conical projection 96 extending upwardly from the neck ring mold into a conforming recess in the bottom of the blank mold 1.

The heretofore described components associated with the plunger 57a at the right of Fig. 12 are duplicated by like components associated with the plunger 57 located at the left of Fig. 12.

It will be seen that by suitably timing the introduction of air through the pipe lines 70, 90 and 92 any desired simultaneous or relative movement of the pressing plungers 57 and 57a and the thimbles 67 and 68 may be had. It also will be apparent that when a blank of different shape or size is desired it is merely necessary to change the blank mold 1, the neck mold 5 and the pressing plunger 57 and these changes may be effected without any change in the mechanism for operating those members.

Means are provided for conducting cooling air from a pipe line 97 to the interior of the right hand plunger 57a (Fig. 12), including a duct 98 formed in a protruding portion 98a of the housing 60, a sliding connection 99 formed by gland 100 and pipe 101, together with duct 102 and distributor 103. It will be seen that the sliding connection 100 assures that cooling air may be supplied from the line 97 into the interior of the plunger 57a at both its raised and lowered positions and while moving therebetween.

The cooling air is exhausted from the plunger 57a through port 104 which communicates with an annular chamber 105 at the base of the plunger and from which cooling air is exhausted downwardly through passageways 106 and 107 and out through exhaust pipe 111 (Fig. 16), a sliding connection similar to 99 (Fig. 12) being provided to maintain communication between passageway 107 and pipe 111 during movement therebetween.

Figure 16:
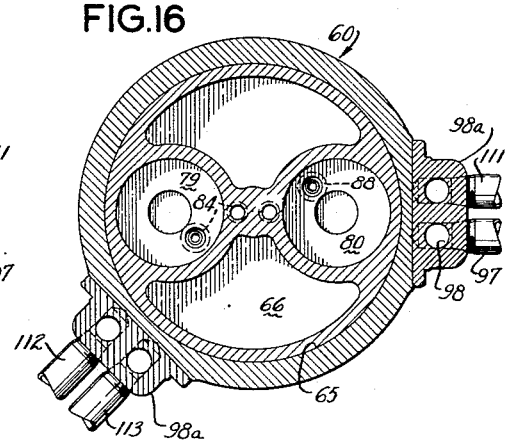
Fig. 16 is a cross-sectional view taken on line 16—16 of Fig. 12.

Similar components are provided for independently supplying cooling air to the left hand plunger 57 (Fig. 12) including supply pipe 112 and exhaust pipe 113 (Fig. 16).

The present invention contemplates the ready interchangeability of the pressing plungers 57 and 57a (Fig. 12) with the neck pins 58 and 58a (Fig. 19) and the ready conversion of the machine from a press-and-blow to a blow-and-blow cycle. It will be understood that in the blow-and-blow cycle, parisons 59 and 59a are formed by a blowing operation rather than the pressed blanks 56 and 56a formed by the plungers 57 and 57a, the same mechanisms heretofore described in connection with Fig. 12 being used to operate the neck pins 58 and 58a as are employed to operate the plungers 57 and 57a.

Referring more particularly to Fig. 19, the neck pins 58 and 58a each comprises a lower portion 115 and an upper portion 116, the lower portions 115 being secured by the screws 15 to the upper end of the piston rods 75 and 76 and the upper portions 116 being secured to the lower portions 115 by split rings 117. Bushings 118 (Fig. 19) replace the thimbles 67 and 68 of the pressing plunger assembly (Fig. 12) and support at their upper ends shorter thimbles 119 which are secured thereto by rings 120. The upper ends of the thimbles are engageable by neck ring molds 5' and 6' which replace the neck ring molds 5 and 6 of the press-and-blow assembly heretofore described in connection with Fig. 12. Similarly, parison molds 121 and 122 replace the blank molds 1 and 2 of the press-and-blow assembly.

It will be seen that the engagement of the thimbles 119 by the closed molds 6' and 5' act to center the neck pins 58 and 58a and assure uniform finish thickness for the narrow neck parisons.

The parisons 59 and 59a are counterblown within the molds 121 and 122 by air pressure which is introduced through the supply pipes 97 and 112, passageways 124 being provided through the neck pins 58 and 58a which communicate at their lower ends with the ducts 102 in the piston rods 75 and 76. It will be seen that the sliding connections 99 in the supply lines to the neck pins 58 and 58a maintain communication between the counterblowing air lines 97 and 112 of the parisons 59 and 59a and their respective counterblowing outlets 124 in every position to which the neck pins 58 and 58a may be raised or retracted by their respective pistons 77 and 78.

The illustrated embodiments of the present invention, in addition to providing actuating mechanism for producing preforms or blanks selectively by pressing or blowing, also provides for single or double gob operation without replacement of the forming mechanism. More particularly, the mechanism for selectively actuating the plunger 57a or the neck pin 58a may be rendered inoperative while permitting the normal operation of the left hand or outer plunger 57 (Fig. 12) or neck pin 58 (Fig. 19) for single gobbing in the blank mold 2 and parison mold 122. When the forming machine is being single gob operated, it is contemplated that the opening in the housing 60 above the piston rod 75 will be capped by a plate (not shown) to prevent dirt or other foreign matter entering the housing.

Stroke adjustment of pressing plungers

In accordance with the present invention, an adjustable stop member 127 is provided having a pair of rubber bumpers 128 and 129 (Fig. 12) for limiting the down positions to which plungers 57 and 57a are drawn by their respective actuating piston rods 75 and 76. A press-and-blow operation involves proper adjustment of the bumpers 128 and 129 so that the plungers 57 and 57a when retracted are properly positioned to receive the glass charges in the up-position of the thimbles and to permit the blanks 56 and 56a to clear the plunger tips when the blanks are transferred to the blow mold station C.

Figure 14:
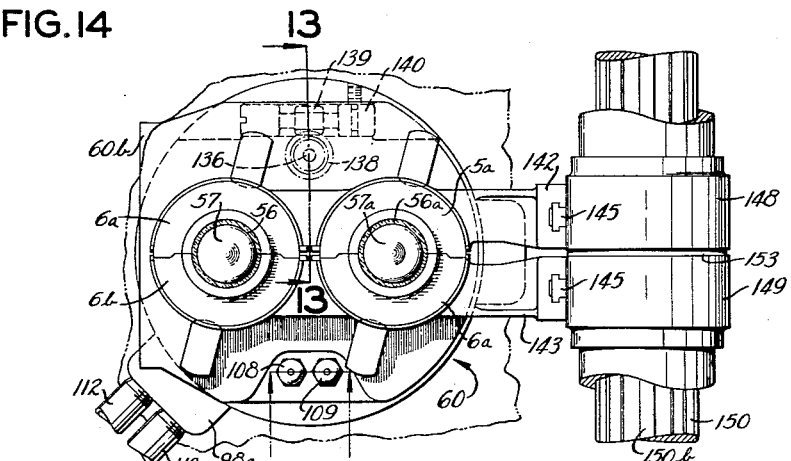
Fig. 14 is a plan view of the pressing plunger and transfer mechanism shown in Fig. 12.

Referring more particularly to the embodiment of the adjustable stop 127 and its operating mechanism shown in Fig. 13, the stop is non-rotatably but operatively mounted on a threaded shaft 130 so that rotation of the shaft serves to raise or lower the stop 127 whereby the bumpers 128 and 129 will engage shoulders 131 and 132 of the respective rods 75 and 76 in their downward travel and limit the stroke of the rods in accordance with the adjustment of the stop 127. As shown in Fig. 13, the shaft 130 is rotatably supported at its ends within the piston 66 and has pinned to it adjacent the upper end, a sprocket 133 for effecting its rotation by means of chain 134 and sprocket 135 which is keyed to a second shaft 136 rotatably mounted in the piston 66. Splined in the upper end of shaft 136 for rotation therewith, is a similar coaxially aligned shaft 137 which has pinned to its upper end a worm gear 138 operably engaged by a worm 139. It will be apparent from Figs. 13 and 14, that rotation of shaft 140, to which the worm 139 is secured, serves to raise or lower the adjustable stop 127 depending upon the direction the shaft 140 is turned. It also will be apparent that the splined engagement of shafts 136 and 137 provides for the adjustment regardless of the position at which the piston 66 has been located relative to the stationary frame member in which shaft 140 is rotatably mounted. The rotating adjustment of shaft 140 may be effected in any conventional manner as by means of a crank (not shown).

Means for indicating positions of pressing plungers

Figure 15:
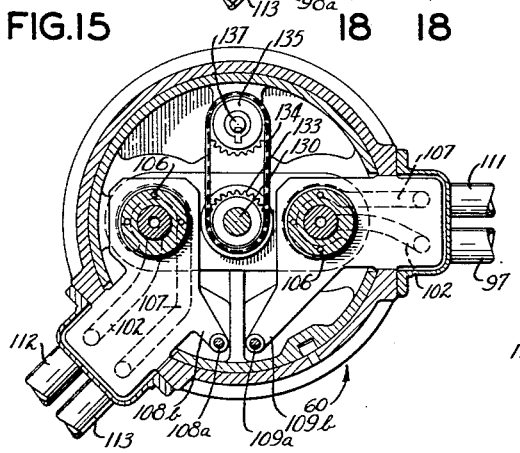
Fig. 15 is a cross-sectional view taken on line 15—15 of Fig. 12.

Fig. 18 illustrates a pair of indicators 108 and 109 for visually indicating to the machine operator the position of the pressing plungers 57 and 57a or neck pins 58 and 58a at all times. More particularly, the indicators 108 and 109 comprise a pair of tappet pins 108a and 109a each of which is vertically and reciprocally mounted in its own bore through portion 60c of the stationary frame 60 and spring pressed into engagement with its own tappet arms 108b and 109b, respectively, which, as shown in Fig. 15, project from and are integral parts of the piston rods 75 and 76. Thus when the concealed plungers 57 and 57a are moved in or out of the molds 1 and 2, their respective indicator pins 108a and 109a move a like amount and the positions of the pins relative to the portion 60c of the stationary housing 60 indicates the positions of the plungers relative to the housing and to each other.

Blank forming operation

The operation at the blank forming station A is substantially the same whether the forming operations are performed by the pressing plungers 57 and 57a as a part of a press-and-blow cycle or the neck pins 58 and 58a as part of a blow-and-blow forming cycle.

In the case of the press-and-blow operation, the plungers 57 and 57a are retracted to their lower position of travel and thimbles 67 and 68 are raised and engaged by the neck ring molds 5 and 6, as shown in Fig. 12. The blank molds 1 and 2 are closed in alignment with the neck ring molds 5 and 6 and a glass charge or gob delivered to each blank mold 1 and 2 by a suitable delivery means (not shown). Baffle heads 125 and 126 are thereupon moved to the positions illustrated in Fig. 12 so as to close the blank molds, and the plungers 57 and 57a are independently raised by the introduction of air pressure into the lines 92 and 90 to press the gobs into the blanks 56 and 56a as shown in Fig. 12.

In the blow-and-blow cycle, after the termination of a molding operation in the parison molds 121 and 122, the neck pins 58 and 58a (Fig. 19) are elevated by admitting fluid under pressure into the cylinders 79 and 80 through the pipes 92 and 90 (Fig. 12). As soon as this is accomplished, the next mold charges may be delivered to the parison molds and compacted in the neck molds and on the neck pins by air pressure from the settle blowheads 125b and 126b. It will be understood that suitable actuating mechanism (not shown) under the control of the timer T, may be provided for moving the settle blowheads 125b and 126b into engagement with the parison molds 121 and 122 in proper timed relation to the operation of the other components of the forming machine.

After the compacting operation, baffle plates 125c and 126c, which may form part of the respective blowheads 125b and 126b, are moved under control of the timer T into engagement with the molds 121 and 122 to act as bottom plates or baffles for the counterblowing operation. During these latter movements, the neck pins 58 and 58a are retracted by introducing air pressure in the lines 81 and 85 under control of the timer T, and exhausting air through the pipes 90 and 92 to depress their respective pistons 77 and 78. Counterblowing pressure is supplied through the pipes 97 and 113, and discharged from the outlets 124 in the neck pins 58 and 58a to counterblow the parisons 59 and 59a. Thereafter the counterblowing pressure is shut off and, if desired, the parison molds 121 and 122 are cracked open so that the chilled skins of the parisons are permitted to reheat to some extent. The parison molds 121 and 122 now are opened wide by timer controlled introduction of air pressure to the cylinder 23 through the pipe 25, and the two parisons 59 and 59a, supported solely by the neck ring molds 5' and 6', are transferred to positions at the blowing station C following retraction of the thimbles 119.

Transfer and invert mechanism

Referring more particularly to the mechanism, designated generally by the letter D, for transferring and inverting the glass preforms from the blank mold station B to the blow mold station C, the following description is made with reference to the neck molds 5 and 6 shown in Fig. 12 which are used in a press-and-blow cycle, but it will be understood that it applies in like manner to the operation of the mechanism with neck molds 5' and 6' in a blow-and-blow cycle.

Figure 21:
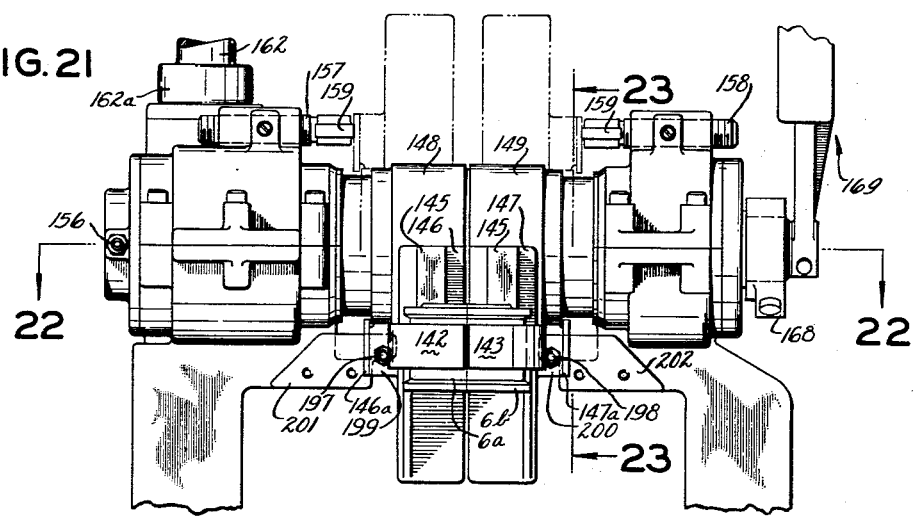
Fig. 21 is an elevation view of the neck ring mold holder and invert mechanism similar to Fig. 6 with the blank mold holder and forming mechanism of the latter view removed.
Figure 22:
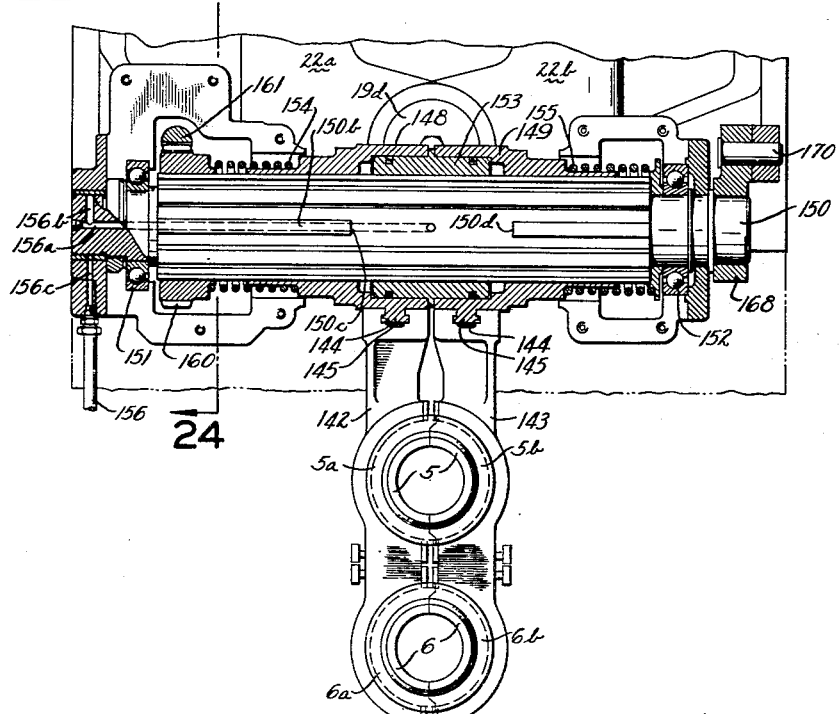
Fig. 22 is a cross-sectional view of the invert mechanism taken on line 22—22 of Fig. 21.

As shown in Figs. 6, 21 and 22, the mechanism D includes a pair of neck ring holder arms 142 and 143 in which are secured the neck mold halves 5a, 5b and 6a, 6b of the molds 5 and 6 preferably with sufficient clearance so that they may position themselves properly with respect to each other and to the blank molds 1 and 2 and blow molds 3 and 4 as well as the plunger thimbles 67 and 68 which they engage (Fig. 12).

Each of the arms 142 and 143 is provided at its inner end with a vertically extending groove 144 of T-shape cross-section (Fig. 22) for adjustable sliding engagement with a tongue or track 145 of similar cross-sectional shape provided on each of a pair of depending arms 146 and 147. Bolts 144a (Fig. 12), or similar clamping members, secure the mold holder arms 142 and 143 to their respective supporting arms 146 and 147 at the desired operating height, thus not only providing for accurate engagement of the neck molds 5 and 6 with the blank molds 1 and 2 and with the blow molds 3 and 4, but also permitting the use of molds of varying sizes depending upon the type of ware being produced. The bottom surfaces of the blank molds 1 and 2 are shown in Fig. 2 as being exactly the same distance below the horizontal inversion axis 7 of the neck rings as the top surfaces of the blow molds 3 and 4 are above it, this being accomplished in the construction of the molds themselves rather than by any particular adjustment of the other parts.

The arms 146 and 147 are individually carried by a pair of opposed fluid pressure cylinders 148 and 149 (Figs. 21 and 22) which are slidably mounted on a rock shaft 150 journaled in bearings 151 and 152. The inner ends of the cylinders 148 and 149 are open and cooperate with a common piston 153 which may be pinned or otherwise suitably secured to the shaft 150. The cylinders 148 and 149 are preferably splined to the shaft 150 as at 150a (Fig. 23) so as to prevent their rotation relative to the piston while permitting them to slide thereon in an axial direction.

The cylinders 148 and 149 normally are yieldably held toward each other so as to maintain the sections of the neck rings 5 and 6 together by means of coil springs 154 and 155 which surround the shaft 150 between the bearings 151, 152 and the cylinders 148, 149. In order to force the cylinders apart and open the neck ring to release the blank, fluid pressure is admitted through a pipe 156 (Fig. 22) which communicates with a passage 156a extending axially through one end of the shaft 150 and is suitably plugged at its outer end. More particularly the passage 156a is connected with a radially extending passage 156b which, as shown in Fig. 22 will be in registration with a bore 156c communicating with the pipe 156 when the neck ring holder arms 142 and 143 are at their position for depositing the blanks 59 and 59a in the blow molds 3 and 4. As shown in Fig. 22, one of the lands 150b of the spline 150a is cut away as at 150c and 150d so that the corresponding groove in the piston 153 provides for conducting pressure to both cylinders simultaneously.

Referring to Figs. 2 and 21, opening of the neck molds 5 and 6 at the blow mold station C is limited by a pair of hardened steel stop plates 146a and 147a which are secured to the supporting arms 146 and 147 and engage a pair of adjustable stops 157 and 158. Preferably the plates 146a and 147a engage rollers 159 mounted on the adjustable stops 157 and 158 so that without closing the neck molds, the plates and rollers may be substantially frictionlessly disengaged upon movement of the neck molds from blow station C to blank mold station B.

The pressure may be exhausted from the cylinders 148 and 149 prior to or during the first part of the reverting movement of the neck rings. During the time the neck rings 5 and 6 are in operative position with respect to the blank molds 1 and 2, it will be apparent that there is no communication between bore 156c and passage 156b and therefore pressures cannot be admitted to the cylinders 148 and 149 to open the neck rings.

*Inverting means*

Secured adjacent one end of the rock arm 150 is a gear 160 (Figs. 22 and 24) which is adapted to be rotated by a rack 161 so as to invert and transfer the neck ring molds 5 and 6 between the blank mold station B and the blow mold station C (Fig. 2). The rack 161 is movable vertically within a housing 162 and is mounted on or integral with a piston rod 163 which extends down from a piston 164 operatively mounted in a cylinder 165. The vertical positioning of the rod 163 permits the rack 161 and gear 160 to be encased and run in oil within the well 162a (Fig. 22) formed in the housing 162. Air pressure is conducted through a pipe 166 to the top of the cylinder 165 to lower the piston 164 and move the neck rings 5 and 6 to their position (shown in phantom in Fig. 2) at the blow mold station C, and through a pipe 167 to the bottom of the cylinder to raise the piston and return the neck rings to their positions at the blank mold station B.

*Invert cushion*

In accordance with the present invention, the ends of the invert stroke are cushioned by a hydraulic mechanism hereinafter described.

Referring more particularly to Figs. 21, 22, 26 and 27, the cushioning mechanism includes a crank 168 which is adjustably secured to one end of the rock shaft 150. A connecting rod, generally designated by the reference number 169, is secured to a stud 170 which is rotatably secured in the outer end of crank 168. As shown in Fig. 26, the connecting rod 169 includes a hollow chamber portion 171 which may be filled with oil by removing the plug 172 and which may be drained by removing plug 173. Firmly secured within chamber 171 is cylindrical tube 174, the lower end of which contains a plug 175 and the open upper end of which extends upwardly from the connecting rod 169 and is reciprocably guided within a cylinder 176 pivotally supported on a pin 177. Pinned or otherwise securely fastened in the cylinder 176 is a piston and piston rod 178 which extends coaxially downward through the cylinder into the bore of the tube 174. Fig. 26 shows the snubber or cushioning mechanism at the extreme position which it assumes when the neck molds 5 and 6 are located at the blank mold station B. It assumes the other of its extreme positions when the neck ring holder arms 142 and 143 assume their positions (shown in phantom) at the blow mold station C. Midway in its travel between the two extremes, the housing 169 containing the chamber 171 is at its lowermost position relative to the piston 178, and at that position the oil level in the chamber 171 should be located at line 179, a glass bull's-eye 180 being provided for visual verification. Movement of the invert mechanism to either of its extreme positions rotates the crank 168 and raises the housing 169 relative to the piston 178 so that oil is driven out of the tube 174 through a small opening 181 spaced upwardly from the plug 175. As the lower end of the piston 178 passes the opening 181, escape of oil from the opening is gradually throttled by a shaved or tapered portion 182 and finally completely cut off by the untapered portion of the piston so that the extreme end of the downward stroke is hydraulically cushioned by the remaining oil in the bottom of the tube 174.

In order to provide for the return to the chamber 171 of any oil which may be forced upwardly around the piston 178 to the cylinder 176, a lateral drain groove 183 is cut in the piston and located in registry with a passage 184 which communicates with the chamber 171. Annular grooves 185 and 186 are also cut in the piston and located in registry with the passage 184 at the lowermost and uppermost positions of the housing 169.

In order to provide for adjustment of the snubber, the pin 177 which pivotally supports the cylinder 176 is secured at its ends in parallel arms 187 and 188 of a bell crank 189. The bell crank 189 is pivotally supported centrally on a pin 190, the ends of which are secured in depending bracket arms 191 and 192 of a fixed or stationary bracket 193. As shown in Fig. 26, the bell crank 189 is urged in a clockwise direction by a spring 194 acting on bell crank arm 195, the extreme clockwise position of which may be adjustably predetermined by adjustment screw 196. Advancement of the screw 196 serves to lower the pin 177 thereby increasing the cushioning or snubbing affected at the ends of the stroke, whereas retraction of adjustment screw 196 raises the pin 177 and decreases the cushioning action.

*Invert adjustment for locating the neck ring molds at the blank mold section A*

Supplementing the cushioning and stroke regulating action of the snubbing mechanism, a pair of adjustable stop screws 197 and 198, which are mounted in lugs 199 and 200 projecting from the respective cylinders 148 and 149 respectively engage fixed hardened steel pads 201 and 202 and accurately locate the neck molds 5 and 6 in registry with the blank molds 1 and 2 at the blank mold station B. Because of the stroke regulating action of the snubbing mechanism, there is practically no wear on the stop screws 197 and 198 and their pads 201 and 202.

The action of both the snubbing mechanism and the adjustable stops 197 and 198 in maintaining proper registry of the neck molds 5 and 6 with the blank molds 1 and 2 is very valuable in preventing checking of wear just below the finish which, heretofore in comparable forming machines, has occurred due to a dropping away of the neck molds following opening of the blank molds and retraction of the plungers and thimbles.

While similar stop screws and pads may be provided for controlling the blow mold end of the invert stroke, in the illustrated embodiment the housing 162 may be vertically adjusted by means of nut 162a (Fig. 24) so that the upper end of the housing engages the piston 164 at the position corresponding to the desired position of the neck molds at the blow mold station C. Following adjustment of the housing 162, a shim or spacing ring 165a of proper size is secured between the housing 162 and the cylinder 165 by bolts 165b.

*Blow mold puff mechanism and operation*

After the neck ring holder arms 142 and 143 are actuated as described to transfer the blanks 56 or parisons 59 to the finish blowing station C, the blanks may be held in their neck-up positions for a puff-blow operation prior to the final blowing operation. The puff-blowing may be effected by a pair of vertically disposed puff-blow tubes 203 and 204 (Figs. 4 and 7) which are secured in axial alignment with the neck ring molds 5 and 6 by a common horizontal supporting member 205 operably mounted for vertically reciprocal movement, as by means of a piston rod 206. An air operated piston and cylinder (not shown) or similar mechanism, which may be actuated by means of air lines 207 and 208 under the control of the timer T (Fig. 28) is, of course, provided for lowering and raising the rod 206 and its puff-blow tubes 203 and 204 into and out of the necks of the glass preforms in timed relation to the operation of the other components of the forming machine. In the illustrated embodiment, air is established in line 207 to lower the tips of the puff-blow tubes 203 and 204 into the necks of the preforms, whereupon puff-blowing air is supplied through a pipe 209 and passageway 210 in the support 205 and discharged from the tubes 203 and 204 to puff-blow the respective blanks 56 and 56a a desired amount without subjecting the preforms to any external molding restraint by the blow molds 3 and 4 or otherwise than by the neck ring molds 5 and 6. Puff blowing may also be effected after the necks of the preforms are released by the neck rings and supported by the blow molds. As shown in Fig. 8, the passageway 210 is provided with a pair of valves 210a and 210b, for adjustably regulating the amount of air supplied to each of the puff-blow tubes 203 and 204.

*Blow mold mechanism and operation*

As heretofore described the blow molds 3 and 4 of the illustrated embodiment each comprise two cooperating sections 3a, 3b and 4a, 4b which are detachably supported by the mold holder arms 22a and 22b which, in turn pivot on the same pin 19 as the blank mold holder arms 18a and 18b.

Following the puff-blowing operation, air is supplied under the control of the timer T through the line 39 to the blow mold operating cylinder 37 to close the blow molds 3 and 4 about the preforms 56 and 56a, whereupon air is supplied from the timer T through line 156 and the connecting passages 156 c, b and a to open the neck ring molds 5 and 6 and deposit the preforms supported by their necks in the closed blow molds 3 and 4.

While the blow molds 3 and 4 may include integral bottom forming portions, it is preferable that they be provided with a separately operable bottom forming plate 211 such as is shown generally in Fig. 8. Suitable means such as are illustrated and described in the patent to Ingle, No. 1,911,119, may be provided for adjusting the bottom plate vertically to cooperate with molds of various sizes, for removing it and substituting other types of bottom plates for various molds, and for lowering and tilting it under the control of the timer T to dump cullet or other foreign matter and to facilitate removal of the finished bottles by means of a suitable take-out mechanism (not shown).

*Final blow head*

The upper portions of the blow molds 3 and 4 are adapted to be closed by substantially identical blow heads generally designated 212a and 212b (Figs. 2 and 20) which are detachably secured to a carrier 213 for vertical movement into and out of their mold engaging positions.

The movement of the carrier 213 may be effected by a conventional air cylinder and associated mechanism (not shown) actuated by air pressure alternately supplied to opposite sides by lines 214a and 214b under the control of the timer T (Fig. 28). The establishment of air pressure in the line 214a lowers the carrier and the blow heads 212a and 212b into their mold engaging position (Fig. 20) while pressure in line 214b acts to move the carrier 213 out of the operating path of the neck molds 5 and 6 and the puff blow tubes 203 and 204. The air pressure is supplied from a line 277 alternately to the lines 214a and 214b by a spring return spool valve 275f (Fig. 28) which is controlled by a line 214 from the timer T.

Referring more particularly to Fig. 20 each of the blow-heads 212a and 212b includes a cylindrical cap 215 the lower lip of which is adapted to press against the top of a blow mold. Suitable vents, as for example, radial extending grooves 215a are provided in the lip so that blowing air within the cap 215 can escape even when the cap firmly engages the mold.

Blowing air is regulably supplied from the timer T through a line 216 (Figs. 20 and 28) to a pair of tubes 216a which are secured in the carrier 213 and extending axially downward to points adjacent the closed bulbous ends 217a of a pair of hollow plungers 217 mounted in the caps 215. More particularly, as shown in Fig. 20, the air from line 216 flows through passages 218 in the carrier 213 into ports 218a which communicate with the bore of the tubes 216a and into passages 216b. A set screw 217e or other suitable means is provided for adjusting the distance which each plunger 217 extends below the cap in which it is secured and the distance which each glass blank 56 and 56a will be stretched by the downward travel of the plungers 217 to the positions shown in Fig. 20.

The blowing air supplied by the line 216 from the timer to the tubes 216a acts to cool the plungers 217 and is discharged through the plunger ports 217b to blow the blanks 56 and 56a into final form within the molds 3 and 4. Preferably, the ports 217b are located within the finish of the glass blanks. Blowing air from the same supply line 216 is simultaneously directed by suitable passages 216b into the space between the finish and the blowhead caps 215. Thus, substantially equal pressure is exerted on both sides of the molded finish and the shape of the finish is not distorted. In addition, the blowing air does not impinge as a directed stream with appreciably greater force against one point or zone of the blown body portion of the blank than another. Thus each blank 56 and 56a is expanded substantially uniformly. Sideway of the blanks is prevented by the cooperative centering effect of the molds 3 and 4 at the top or finish and of the bulbous plungers 217 on the bottoms of the blanks. Preferably, the shank of each stretching plunger is substantially thinner than its bulbous lower end so that the shank is not contacted by any portion of the blank which may "neck-in" when it is stretched.

The stretching plungers 217 are particularly effective in the reformation of the pressed blanks 56 into finished glassware and are primarily intended for that use. It will be seen that they may be readily removed so that the blowheads 212a and 212b may be used without them in blowing the blown parisons 59 and 59a to final form.

*Mold holder arms*

The mold holder arms 18a, 18b, 22a and 22b which are shown in Figs. 1 to 9 and which heretofore have been generally described with reference to their location, and their operation in opening and closing the blank and blow molds 1, 2, 3 and 4, will now be described in greater detail with reference to the blank mold arm 18a for features common to all of the arms and particularly the load supporting and cooling features.

As best shown in Figs. 2 and 3, the blank mold arm 18a comprises an irregularly shaped casting 220 having a lower ring portion 221 which pivots on the vertical shaft 19, and an upwardly and outwardly extending hollow body portion 222 having an internal passage 223 for directing cooling air from a kidney-shaped intake opening 224 to a discharge nozzle member 226 secured on top of the casting 220. The member 226 is provided with two separate discharge outlets 227 and 228 for directing cooling air against the outer surfaces of the respective blank mold sections or halves 1a and 2a shown in Figs. 2 and 6.

As previously described, the mold sections 1a and 2a are carried by the mold holder 9a which is secured under the nozzle 226 to the top of the casting 220 by the pins 16 and 17.

As shown in Figs. 2 and 6, the weight load of the blank mold sections 1a and 2a and of the arm 18a is supported through a flat bearing plate 229 which is located approximately midway between the mold sections 1a and 1b and slides on a supporting portion 230 of the base or frame 8. By carrying the weight of the arm 18a and mold sections 1a and 2a, the support 230 relieves the shaft 19 of that load and provides for easy pivotal movement of the arm about the shaft end, in addition prevents the mold sections from sagging out of proper alignment with the pressing plungers 57 and 57a and the neck ring mold sections 5a, 5b and 6a, 6b.

The mold arm 18a, thus far described, is substantially the identical counterpart of arm 18b, like parts being designated by like reference numbers primed.

The two blank mold arms 18a and 18b are further provided with arcuate projections 231 and 232 (Figs. 2, 3 and 6) having horizontal slidably engaged bearing surfaces 233 and 234 located radially outward of the pin 19, which cooperate to prevent canting of the mold sections 1a, 1b and 2a, 2b away from each other out of mating alignment and out of alignment with the neck ring sections 5a, 5b and 6a, 6b and the plungers 57 and 57a. It will be appreciated that the aligning restraint provided by the bearing surfaces 233 and 234 is effective at right angles to the aligning restraint of the bearing plates 229 and the two restraints thus contribute the necessary components to retain the molds 1 and 2 in their vertical positions at all times.

As best shown in Figs. 2 through 5, inclusive, the blow mold arm 22a comprises a similar irregularly shaped casting 235 having a lower ring portion 236 which pivots on the vertical shaft 19, and an upwardly and outwardly hollow body portion 237 having an internal passage 238 for directing cooling air from a kidney-shaped intake opening 239 defined by a lip 240 to a discharge nozzle member 241 secured on top of the casting 235. The member 241 is provided with two separate discharge outlets 242 and 243 for directing cooling air against the outer surfaces of the respective neck ring mold sections or halves 5a and 6a when the latter are located at the blow station C as shown in Fig. 2.

As previously described, the blow mold sections 3a and 4a are carried by the mold holder 10a which is secured under the nozzle 241 to the top of the casting 235 by the pins 20 and 21.

Cooling air from the passage 238 is directed against the exterior of the mold sections 3a and 4a by respective openings 244 and 245 located in the wall of the casting 235. Louvre plates 246, or similar means are secured over openings 244 and 245 for directing the cooling air to various portions of the mold sections and in desired relative amounts. Preferably, the cooling air is applied to the outside of the molds only when they are closed thereby preventing the cooling air from hitting the inner or forming surfaces which tends to create spotty cooling and cause uneven distribution of glass in the finished product. When the forming machine section A is single gobbing, either press-and-blow or blow-and-blow, the inner louvre 246 may be replaced by a stopper plate 246a (Fig. 7) to prevent the discharge of cooling air from the underlying opening 244 (Fig. 2).

As shown in Figs. 2 and 7, the arm 22a is provided with a bearing plate 248 which slides on a fixed supporting portion 249 of the base 8 and relieves the shaft 19 of the weight load of the mold sections 3a and 4a and the supporting arm 22a. As in the case of each blank mold arm bearing plate 229, the blow mold arm supporting plate 248 which transmits the weight to the support 249 is located midway between the two mold sections 3a and 4a so that the weight of the two sections is evenly balanced and not only relieves the shaft 19 of that load but also provides for easy pivotal movement of the arm about the shaft and, in addition, prevents the mold sections from sagging out of proper alignment with the neck ring mold sections 5a and 6a.

The mold arm 22a, thus far described, is substantially the identical counterpart of arm 22b, like parts being designated by like reference numbers in the drawings.

*Cooling air supply and control*

Cooling air is supplied to the kidney-shaped opening 239 (Figs. 3, 5 and 7) in each of the blow mold arms 22a and 22b from a large pressure chamber 250 located at the bottom of the section base 8, the horizontal table plate portion 8c of which serves as the top of the chamber 250. Air may be supplied to the chamber under pressure from a blower or similar pressure effecting means (not shown), and a desired pressure maintained by conventional automatic regulating means, suitable gauges being provided as needed to indicate the air pressure within the chamber.

Figure 5:
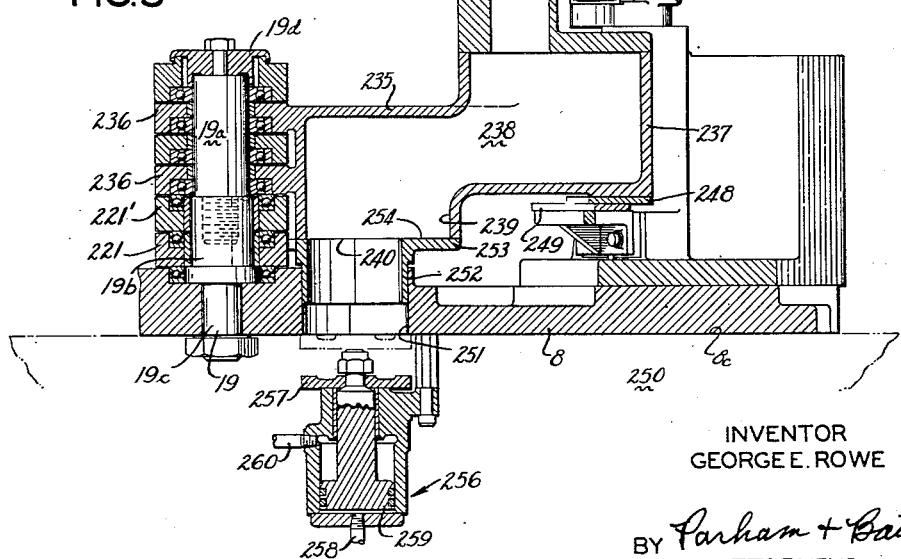
Fig. 5 is a sectional view taken on the irregular line 5—5 of Fig. 1 showing details of the hinge pin assembly together with a hollow blow mold holder arm and the valve mechanism for controlling the cooling air supplied thereto.

As is shown in Fig. 5, cooling air may be regulably supplied from the chamber 250 to the blow mold arm 22a through a circular passageway 251 in the plate 8c in which is slidably fitted a sleeve or bushing 252 having a kidney-shaped peripheral flange 253, the upper surface 254 of which is spring pressed as at 255 (Fig. 7) into continuous sliding engagement with the entire lip 240 of the kidney-shaped opening 239 in the arm 22a. This construction provides a passage for cooling air from the chamber 250 through the hollow arm 22a to the discharge openings 242, 243, 244 and 245 when the mold sections carried by the arm 22a are in both their open and their closed positions as well as while being moved therebetween.

The cooling air supplied to the blow mold holder arm 22a is controlled by a piston actuated valve generally indicated at 256, the housing of which is secured to the underside of the plate 8c and which includes a closure member 257 that is operatively movable upwardly to close the passageway 251 and prevent passage of cooling air from the chamber 250 to the arm 22a. The valve closure member 257 is normally held in the upper or closed position by continuous application of low pressure air from a line 258 onto piston 259 of the valve 256. The valve piston 259 is retractable by high pressure air, which is supplied through a second line 260 controlled by the timer T, to permit passage of cooling air from the chamber 250 through the arm 22a onto the blow mold sections 3a and 4a.

It will be understood that valves identical with the valve 256 and controlled in like manner by the timer T, are provided for regulably controlling the cooling air from the chamber 250 to the blow mold arm 22b and to each of blank mold arms 18a and 18b. The low pressure line 258 is common to each of these valves which are respectively identified as 261, 262, and 263 in the drawings (Figs. 2, 4 and 28). The same high pressure line 260 may control both of the blow mold arm valves 256 and 261 while a second high pressure line 264 from the timer controls both of the blank mold valves 262 and 263.

Four similarly mounted valves, two of which are shown at 265 and 266 (Fig. 6), are controlled by a third high pressure line 267 from the timer (Fig. 28), and regulate the supply of cooling air from the chamber 250 to the exterior of the four neck ring mold sections 5a, 5b, 6a and 6b through individual nozzles, the nozzles for cooling the mold sections 5a and 6a being shown at 268a and 269a, respectively (Fig. 2), and for cooling 5b and 6b being shown at 268b and 269b, respectively (Fig. 1). The cooling air can be on full time or intermittent and varied for blank, blow and neck molds as necessary. In place of the three valve control lines 260, 264 and 267, eight such timer controlled lines (not shown) may be employed so as to provide for independent control by the timer T of the cooling air to each of the neck ring mold sections 5a, 5b, 6a and 6b at blank mold station B and to each pair of blank mold sections 1a, 2a and 1b, 2b and to each pair of blow mold sections 3a, 4a and 3b, 4b in the event that the additional differential temperature regulation is required.

*Timing mechanism*

The operation of the described components of the forming machine section together with the devices which operate in connection therewith is controlled by a plurality of similar valve mechanism which are incorporated in the timer T (Fig. 28) and assure properly timed actuation of all the components.

The timer includes a drum or cylinder 271 which is rotated in timed relation to the feeding of charges to the blank molds 1 and 2. The drum 271 has a series of circumferential grooves 272 in each of which is adjustably secured one or more buttons or studs 273 for actuating trip valve mechanisms within an air chest 274 and thereby controlling the supply of operating air to the components of the forming machine section A. Engagement of one of the buttons with its valve actuating mechanism serves to open the associated valve and establish air pressure in the air line which it controls. Subsequent engagement of the actuating mechanism by a second or following button in the same groove closes the valve and relieves the pressure in the line.

In addition to the trip valve mechanisms of the timer T, a number of air operated spool valves generally designated 275, each having a spring return, continuously supply operating air from a common source of air such as the air chest 274 to alternate air lines. The purposes of each spool valve 275 is to translate the application and the subsequent relief of air pressure by the timer control valves into two applications of pressure as is described in greater detail hereinafter. The spool valves, in addition to reducing the number of necessary trip actuated valves in the air chest 274 of the timer, have the further advantage of being locatable adjacent the point at which their air pressure is applied. The machine of the present invention preferably is provided with automatic mold lubricating means such as are shown and described in the copending application of myself, Walter K. Berthold and Paul A. Dauksas, Serial No. 81,668, filed March 16, 1949, and now abandoned.

Operation

From the foregoing description it will be seen that (by means of adjustments provided therein) the machine selectively may be operated either as a "blow-and-blow" machine or as a "press-and-blow" machine. It may also selectively be employed as a "single gob" and a "plural gob" machine. The changes required comprise only substitution of molding parts and the operation of adjusting means built into the machine to vary the operation from one type to another. Such variation may be accomplished with ease and well within the time usually required with any of the automatic machines now commonly in use to change the molds and associated molding parts, and to reset the feeder and timing means in passing from one size or shape of article to another. This "universality" of the machine of the present invention does not exist in any other machine known to me. With the single exception of the Hartford Empire Company's I. S. Machine (see U. S. Patents Nos. 1,911,119, 2,289,046, 2,290,798, 2,309,378 and 2,355,036) the machines heretofore employed have been either "blow-and-blow" or "press-and-blow" machines. The manufacturer employing such machines and desiring to change from blownware to pressed and blown ware at a given ring hole is obliged to remove one machine and substitute another.

The Hartford Empire Company I. S. Machine was originally a single gob "blow-and-blow" machine, though more recently it has been made possible to make certain structural changes therein and additions thereto through which it may be converted into a "press-and-blow" machine and/or to a "double gob" machine without removal of the machine from the ring hole. Such changes and additions however, are relatively extensive and require substantial periods of "down time" over and above that required to change molds, resetting the feeder and timer in changing from the manufacturer of one article to another.

Press-and-blow operation

Generally speaking the machine of the present invention when making ware by the "press-and-blow" method employs the process described and claimed in my Patent No. 2,289,046. More specifically in such operation, rotation of the timer drum 271 is synchronized with the rate at which glass charges are fed to the blank molds 1 and 2. The timer button 273 associated with the air line 24 is adjusted so that air is supplied to the blank mold operating cylinder 23 to close the molds 1 and 2 prior to receipt of the glass charges. As shown in Fig. 12, the blank molds 1 and 2 close on the neck ring molds 5 and 6. Thimbles 67 and 68 are raised and held in their raised positions by air pressure that is supplied through the line 70 from the timer T to raise the thimble supporting piston 66 to its upper position. Immediately after the glass charges enter the molds the baffles 125 and 126 are moved to the positions shown in Fig. 12 as by means of air pressure supplied from the timer T through a line 276 to suitable baffle actuating mechanism (not shown). Thereafter, the plunger supporting pistons 77 and 78, and the plungers 57 and 57a press the glass charges into the blanks 56 and 56a in a minimum of time and with a minimum of cooling engagement with the molding surfaces.

The operating air to each piston 77 and 78 is supplied by the respective lines 92 and 90 which are individually controlled by their respective spool valves 275a and 275b, each of which is independently controlled through lines 90a and 92a by the timer T so that the movement of one plunger may be independently regulated relative to the other. This not only permits exact control of each plunger operation to suit the conditions of delivery of the separate charges but permits the discontinuance of operations at one of the molds when single gob operation is desired.

Air is supplied through lines 92a and 90a from the timer T to actuate the spool valves 275a and 275b and connect the lines 92 and 90 with a constant pressure air line 277. Preferably the valves 275a and 275b are located adjacent the mechanism for actuating the plungers so that the lines 92 and 90 are short and operation of the plungers is effected with a minimum of lag following actuation of the spool valves.

The air pressure in each line 90 and 92 may be regulated by suitable adjustable regulators 90b and 92b, respectively to control the force exerted by the plungers on the glass charges.

During and/or intermediate the pressing operations, the plungers 57 and 57a may be internally cooled by regulable quantities of cooling air which are independently supplied from the timer T through the air lines 97 and 112.

Following formation of the blanks 56 and 56a in the blank molds 1 and 2 and the neck molds 5 and 6, the proper trip valve mechanisms of the timer T relieve the pressure in lines 92a and 90a, either simultaneously or in any desired timed sequence, whereupon their respective spool valves 275a and 275b are spring actuated to connect a branch of the high pressure line 277 with the lines 81 and 85 and effect retraction of the plungers 57 and 57a. Thereafter, the timer discontinues the pressure in the line 70 thus permitting retraction of the thimble supporting piston 66 by gravity.

Thereupon the timer T relieves the pressure in the line 24 and approximately simultaneously establishes pressure in line 25 which forces piston 26 to the opposite end of its stroke (Fig. 9) and thereby opens the blank molds 1 and 2. Thereafter, air pressure is established by the timer in a line 278 to actuate spool valve 275c and establish air pressure in the invert cylinder 165 through the line 166 thereby effecting transfer of the blanks 56 and 56a from their neck-down positions at station B to their neck-up position at the blow mold station C (Fig. 2). Reheating of the blanks may be affected in a desired amount between the opening of the blank molds 1 and 2 and the subsequent blowing of the blanks at the blow mold station C by delaying the closing of the molds 3 and 4 and permitting the internal heat of the interior of the glass to raise the temperature of the chilled outer surfaces.

Closing of the blow molds 3 and 4 about the blanks 56 and 56a is effected by establishing air pressure in a line 308a to a spool valve 275e (Fig. 28) which serves to connect the line 38 with high pressure air and thereby move the blow mold actuating piston 40 to its mold closing position (Fig. 10). Concurrently, the timer T establishes air pressure in the line 156 to open the neck ring molds 5 and 6 and effect a substantially free transfer of the blanks 56 and 56a into neck supporting engagement in the closed blow molds (Fig. 20). Air pressure is now relieved in the line 278 whereupon the spool valve 275c is spring actuated to disconnect the line 166 from its source of high pressure air and to connect that source with the line 167 (Fig. 24) for returning the neck ring molds 5 and 6 to their positions at the blank mold station B.

The blowheads 212a and 212b are then lowered under control of the timer T which establishes air pressure in the line 214 so that the spool valve 275f connects the high pressure line 277 to the line 214a for lowering the blowhead carrier 213 by means of the operating cylinder (not shown). The downward movement of the blowheads 212a and 212b causes the lower bulbous ends 217a of the blowhead plungers 217 to engage and stretch the blanks 56 and 56a downwardly to predetermined points adjacent the bottom of the blow molds. Further downward movement of the blowheads 212a and 212b is prevented by their engagement with the tops of the molds 3 and 4. Thereafter, the timer T supplies air through the line 216 to the supply tubes 216a from the lower ends of which the air flows upwardly through the plungers 217 in cooling relationship thereto and out through the ports 217b and blows the stretched blanks into molding engagement with molds 3 and 4.

Having completed the blowing operation, the timer interrupts the supply of blowing air to the line 216, and thereafter, interrupts the pressure in the line 214 whereupon the spool valve 275f is spring actuated to connect line 214b with the high pressure line 277 to retract the blowheads. Finally, the pressure in the line 308a is discontinued whereupon the spring actuated spool valve 275e establishes blow mold opening pressure in the line 39 which opens the molds 3 and 4 and presents the finished articles supported on the bottom plates and for removal by a suitable takeout mechanism (not shown).

As shown in Fig. 20, the blowhead mechanism may be provided with channels 219 and passages 219a which exhaust through the passage 216 and the timer T and thus provide for continuous cooling of the glass after it has been fully expanded to the shape of the blow mold by the passage of air into and out of the article.

The engagement of the plungers 217 with the bottom of the blanks 56 and 56a prevents side sway of its blanks which might result in heel taps and thus the plungers aid in uniform distribution of the glass articles now being made.

The shapes of the blow head plungers 217 are of importance and are such as to prevent the side portions of the blank, which "neck-in" during the stretching operation, from contacting the stem of the plunger and thus creating uncontrolled chilled spots which would prevent the desired uniform expansion of the side walls of the blank during final blowing.

Blow-and-blow operation

As is readily apparent, the machine permits great flexibility of operation. When operated as a blow-and-blow machine, it may employ the usual so-called "narrow neck" cycle, comprising in order: feeding of the charges to the mold, settle blowing, neck pin retraction and corkage reheat, counterblowing, parison reheating and final blowing. The timing of several portions of the cycle may be selected to give the particular cycle best suited for ware being made.

The machine may also employ such a cycle modified by the introduction of "puff-blowing" during a part of the reheat period. Also the machine may be adapted through substitution of so-called hollow neck pins, similar to those disclosed in my Patents Nos. 2,142,954 and 2,142,955, to carry out a cycle which substantially eliminates the corkage reheat between settle blowing and counterblowing.

The following is a general statement of an operation employing the general narrow neck cycle. Rotation of the timer drum 271 is synchronized with the rate at which glass charges are fed to the blank molds 1 and 2, and the timer button 273 associated with the air line 24 is adjusted so that air is supplied to the blank mold operating cylinder 23 to close the molds 1 and 2 prior to receipt of the glass charges. As shown in Fig. 19, the blank molds 1 and 2 close on the closed neck ring molds 5 and 6 which have been closed on the thimbles 119. The thimbles are held in their raised positions by air pressure that is supplied through the line 70 from the timer T to raise the thimble supporting piston 66 to its upper position. Thereafter the settle blow-heads 125b and 126b are moved into engagement with the molds 121 and 122 under the control of the timer T, which supplies air to actuate spool valve 275g and connect the blowhead actuating mechanism (not shown) with air pressure for lowering the settle heads 125b and 126b.

Settle blow air is introduced into the molds from the blowheads through lines 125a and 126a from the timer T to compact the glass chargers on the neck pins 58 and 58a in the cavities of the parison molds and the neck molds (Fig. 19). Thereafter, the neck pins 58 and 58a and their operating pistons 77 and 78 are retracted by air pressure which is supplied through lines 81 and 85 from their respective spool valves 275a and 275b when air pressure in the lines 90a and 92a to the spool valves is disconnected by the timer. Contemporaneously, air is supplied through line 276 to lower the baffles 125 and 126 into engagement with the molds 121 and 122, and counterblowing air is thereafter supplied from the timer through lines 97 and 113 to counterblow the parisons 59 and 59a.

In finishing the parisons 59 and 59a, the forming machine is operated in substantially the same way as has been heretofore described with reference to the finishing of the blanks 56 and 56a in the press-and-blow cycle. Normally, the stretching plungers 217 will be removed from the blowheads 212a and 212b the operation of which, otherwise is the same as previously described.

When the cycle is modified by the introduction of puff blowing, the mechanism heretofore described is employed as follows:

When the parisons held in the neck rings have reached the blowing station, and prior to closing the blow molds the tips of the puff-blowing tubes 203 and 204 may be lowered into the necks of the parisons 59 and 59a by establishing pressure in the line 207a and thereby moving spool valve 275d to connect a branch of the high pressure line 277 with the line 207 for lowering the puff-tubes 203 and 204. At the lowermost position of the puff-tubes, a low pressure air line is automatically connected with the common supply pipe 209 for which air is discharged through the tubes to puff-blow the blanks. Thereafter, the timer T relieves the pressure in the line 207a whereupon the spool valve 275d is spring actuated to connect the branch of the line 277 with the line 208 which retracts the puff-tubes 203 and 204 by means of an air motor (not shown). The initial retracting movement of the puff-tubes disconnects the line 209 from its source of high pressure air and automatically terminates the puff blowing operation.

The various provisions heretofore described and their combinations have resulted in a machine which, among its other advantages, permits the manufacture of glassware having extremely uniform wall thickness and which permit substantial reduction in the weight of the glassware.

I claim:

1. In a glassware forming machine for selectively making blown and pressed and blown ware, a preform station, a preform mold and a neck ring adapted for use at said station, a carrier, a neck pin and a pressing plunger interchangeably mounted on said carrier, means for reciprocating said carrier and means for varying the stroke of the carrier selectively to move the neck pin into and out of the neck ring and the pressing plunger into the preform mold to press glass into blanks therein.

2. A forming machine for selectively making blown and pressed and blown ware comprising interchangeable pairs of preform molds, a pair of blow-molding neck pins and an interchangeable pair of press-molding plungers permanently installed mechanism for reciprocating the pairs of neck pins toward and away from a pair of the preform molds and the interchangeable pressing plungers into and out of another of the pairs of said preform molds, means for interchangeably attaching said plungers and neck pins to said mechanism, means for independently actuating said mechanism to selectively and independently form blanks and parisons in the preform molds, and means for blowing the blanks and parisons to final form.

3. A glassware forming machine comprising interchangeable pairs of preform molds and interchangeable pairs of blow molds, a pair of blow-molding neck pins and an interchangeable pair of press-molding plungers permanently installed mechanism for independently actuating the plungers and the interchangeable pins to selectively and independently form blanks and parisons in respective pairs of the preform molds, means for interchangeably attaching said pins and said plungers to said mechanism, means for selectively supplying cooling air independently to each plunger and counterblowing air independently through each neck pin, and means for blowing the blanks and parisons to final form in respective pairs of the blow molds.

4. A glassware forming machine in accordance with claim 3 and comprising means for rendering the actuating and air supplying means associated with one of a pair of said preform molds inoperative while maintaining operative the actuating and air supplying means of the other of the pair of preform molds.

5. An automatic machine for forming glassware including interchangeable multi-section preform molds and interchangeable multi-section blow molds, a pair of pivotally operable preform mold holder arms each of which supports a section of one of the interchangeable preform molds for movement to open and closed positions, a pair of pivotally operable blow mold holder arms each of which supports a section of one of the interchangeable blow molds for movement to open and closed positions, a blow mold neck pin and an interchangeable press mold plunger permanently installed actuating mechanism for reciprocating the pressing plunger and the interchangeable neck pin selectively to press a blank in one of the preform molds and form a parison in another of the preform molds, means for interchangeably attaching said pin and said plunger to said mechanism, and adjustable stop means for limiting the movement of the plunger and the neck pin.

greater detail hereinafter. The spool valves, in addition to reducing the number of necessary trip actuated valves in the air chest 274 of the timer, have the further advantage of being locatable adjacent the point at which their air pressure is applied. The machine of the present invention preferably is provided with automatic mold lubricating means such as are shown and described in the copending application of myself, Walter K. Berthold and Paul A. Dauksas, Serial No. 81,668, filed March 16, 1949, and now abandoned.

Operation

From the foregoing description it will be seen that (by means of adjustments provided therein) the machine selectively may be operated either as a "blow-and-blow" machine or as a "press-and-blow" machine. It may also selectively be employed as a "single gob" and a "plural gob" machine. The changes required comprise only substitution of molding parts and the operation of adjusting means built into the machine to vary the operation from one type to another. Such variation may be accomplished with ease and well within the time usually required with any of the automatic machines now commonly in use to change the molds and associated molding parts, and to reset the feeder and timing means in passing from one size or shape of article to another. This "universality" of the machine of the present invention does not exist in any other machine known to me. With the single exception of the Hartford Empire Company's I. S. Machine (see U. S. Patents Nos. 1,911,119, 2,289,046, 2,290,798, 2,309,378 and 2,355,036) the machines heretofore employed have been either "blow-and-blow" or "press-and-blow" machines. The manufacturer employing such machines and desiring to change from blownware to pressed and blown ware at a given ring hole is obliged to remove one machine and substitute another.

The Hartford Empire Company I. S. Machine was originally a single gob "blow-and-blow" machine, though more recently it has been made possible to make certain structural changes therein and additions thereto through which it may be converted into a "press-and-blow" machine and/or to a "double gob" machine without removal of the machine from the ring hole. Such changes and additions however, are relatively extensive and require substantial periods of "down time" over and above that required to change molds, resetting the feeder and timer in changing from the manufacturer of one article to another.

Press-and-blow operation

Generally speaking the machine of the present invention when making ware by the "press-and-blow" method employs the process described and claimed in my Patent No. 2,289,046. More specifically in such operation, rotation of the timer drum 271 is synchronized with the rate at which glass charges are fed to the blank molds 1 and 2. The timer button 273 associated with the air line 24 is adjusted so that air is supplied to the blank mold operating cylinder 23 to close the molds 1 and 2 prior to receipt of the glass charges. As shown in Fig. 12, the blank molds 1 and 2 close on the neck ring molds 5 and 6. Thimbles 67 and 68 are raised and held in their raised positions by air pressure that is supplied through the line 70 from the timer T to raise the thimble supporting piston 66 to its upper position. Immediately after the glass charges enter the molds the baffles 125 and 126 are moved to the positions shown in Fig. 12 as by means of air pressure supplied from the timer T through a line 276 to suitable baffle actuating mechanism (not shown). Thereafter, the plunger supporting pistons 77 and 78, and the plungers 57 and 57a press the glass charges into the blanks 56 and 56a in a minimum of time and with a minimum of cooling engagement with the molding surfaces.

The operating air to each piston 77 and 78 is supplied by the respective lines 92 and 90 which are individually controlled by their respective spool valves 275a and 275b, each of which is independently controlled through lines 90a and 92a by the timer T so that the movement of one plunger may be independently regulated relative to the other. This not only permits exact control of each plunger operation to suit the conditions of delivery of the separate charges but permits the discontinuance of operations at one of the molds when single gob operation is desired.

Air is supplied through lines 92a and 90a from the timer T to actuate the spool valves 275a and 275b and connect the lines 92 and 90 with a constant pressure air line 277. Preferably the valves 275a and 275b are located adjacent the mechanism for actuating the plungers so that the lines 92 and 90 are short and operation of the plungers is effected with a minimum of lag following actuation of the spool valves.

The air pressure in each line 90 and 92 may be regulated by suitable adjustable regulators 90b and 92b, respectively to control the force exerted by the plungers on the glass charges.

During and/or intermediate the pressing operations, the plungers 57 and 57a may be internally cooled by regulable quantities of cooling air which are independently supplied from the timer T through the air lines 97 and 112.

Following formation of the blanks 56 and 56a in the blank molds 1 and 2 and the neck molds 5 and 6, the proper trip valve mechanisms of the timer T relieve the pressure in lines 92a and 90a, either simultaneously or in any desired timed sequence, whereupon their respective spool valves 275a and 275b are spring actuated to connect a branch of the high pressure line 277 with the lines 81 and 85 and effect retraction of the plungers 57 and 57a. Thereafter, the timer discontinues the pressure in the line 70 thus permitting retraction of the thimble supporting piston 66 by gravity.

Thereupon the timer T relieves the pressure in the line 24 and approximately simultaneously establishes pressure in line 25 which forces piston 26 to the opposite end of its stroke (Fig. 9) and thereby opens the blank molds 1 and 2. Thereafter, air pressure is established by the timer in a line 278 to actuate spool valve 275c and establish air pressure in the invert cylinder 165 through the line 166 thereby effecting transfer of the blanks 56 and 56a from their neck-down positions at station B to their neck-up position at the blow mold station C (Fig. 2). Reheating of the blanks may be affected in a desired amount between the opening of the blank molds 1 and 2 and the subsequent blowing of the blanks at the blow mold station C by delaying the closing of the molds 3 and 4 and permitting the internal heat of the interior of the glass to raise the temperature of the chilled outer surfaces.

Closing of the blow molds 3 and 4 about the blanks 56 and 56a is effected by establishing air pressure in a line 308a to a spool valve 275e (Fig. 28) which serves to connect the line 38 with high pressure air and thereby move the blow mold actuating piston 40 to its mold closing position (Fig. 10). Concurrently, the timer T establishes air pressure in the line 156 to open the neck ring molds 5 and 6 and effect a substantially free transfer of the blanks 56 and 56a into neck supporting engagement in the closed blow molds (Fig. 20). Air pressure is now relieved in the line 278 whereupon the spool valve 275c is spring actuated to disconnect the line 166 from its source of high pressure air and to connect that source with the line 167 (Fig. 24) for returning the neck ring molds 5 and 6 to their positions at the blank mold station B.

The blowheads 212a and 212b are then lowered under control of the timer T which establishes air pressure in the line 214 so that the spool valve 275f connects the high pressure line 277 to the line 214a for lowering the blowhead carrier 213 by means of the operating cylinder (not shown). The downward movement of the blowheads 212a and 212b causes the lower bulbous ends 217a of the blowhead plungers 217 to engage and stretch the blanks 56 and 56a downwardly to predetermined points adjacent the bottom of the blow molds. Further downward movement of the blowheads 212a and 212b is prevented by their engagement with the tops of the molds 3 and 4. Thereafter, the timer T supplies air through the line 216 to the supply tubes 216a from the lower ends of which the air flows upwardly through the plungers 217 in cooling relationship thereto and out through the ports 217b and blows the stretched blanks into molding engagement with molds 3 and 4.

Having completed the blowing operation, the timer interrupts the supply of blowing air to the line 216, and thereafter, interrupts the pressure in the line 214 whereupon the spool valve 275f is spring actuated to connect line 214b with the high pressure line 277 to retract the blowheads. Finally, the pressure in the line 308a is discontinued whereupon the spring actuated spool valve 275e establishes blow mold opening pressure in the line 39 which opens the molds 3 and 4 and presents the finished articles supported on the bottom plates and for removal by a suitable takeout mechanism (not shown).

As shown in Fig. 20, the blowhead mechanism may be provided with channels 219 and passages 219a which exhaust through the passage 216 and the timer T and thus provide for continuous cooling of the glass after it has been fully expanded to the shape of the blow mold by the passage of air into and out of the article.

The engagement of the plungers 217 with the bottom of the blanks 56 and 56a prevents side sway of its blanks which might result in heel taps and thus the plungers aid in uniform distribution of the glass articles now being made.

The shapes of the blow head plungers 217 are of importance and are such as to prevent the side portions of the blank, which "neck-in" during the stretching operation, from contacting the stem of the plunger and thus creating uncontrolled chilled spots which would prevent the desired uniform expansion of the side walls of the blank during final blowing.

*Blow-and-blow operation*

As is readily apparent, the machine permits great flexibility of operation. When operated as a blow-and-blow machine, it may employ the usual so-called "narrow neck" cycle, comprising in order: feeding of the charges to the mold, settle blowing, neck pin retraction and corkage reheat, counterblowing, parison reheating and final blowing. The timing of several portions of the cycle may be selected to give the particular cycle best suited for ware being made.

The machine may also employ such a cycle modified by the introduction of "puff-blowing" during a part of the reheat period. Also the machine may be adapted through substitution of so-called hollow neck pins, similar to those disclosed in my Patents Nos. 2,142,954 and 2,142,955, to carry out a cycle which substantially eliminates the corkage reheat between settle blowing and counterblowing.

The following is a general statement of an operation employing the general narrow neck cycle. Rotation of the timer drum 271 is synchronized with the rate at which glass charges are fed to the blank molds 1 and 2, and the timer button 273 associated with the air line 24 is adjusted so that air is supplied to the blank mold operating cylinder 23 to close the molds 1 and 2 prior to receipt of the glass charges. As shown in Fig. 19, the blank molds 1 and 2 close on the closed neck ring molds 5 and 6 which have been closed on the thimbles 119. The thimbles are held in their raised positions by air pressure that is supplied through the line 70 from the timer T to raise the thimble supporting piston 66 to its upper position. Thereafter the settle blow-heads 125b and 126b are moved into engagement with the molds 121 and 122 under the control of the timer T, which supplies air to actuate spool valve 275g and connect the blowhead actuating mechanism (not shown) with air pressure for lowering the settle heads 125b and 126b.

Settle blow air is introduced into the molds from the blowheads through lines 125a and 126a from the timer T to compact the glass chargers on the neck pins 58 and 58a in the cavities of the parison molds and the neck molds (Fig. 19). Thereafter, the neck pins 58 and 58a and their operating pistons 77 and 78 are retracted by air pressure which is supplied through lines 81 and 85 from their respective spool valves 275a and 275b when air pressure in the lines 90a and 92a to the spool valves is disconnected by the timer. Contemporaneously, air is supplied through line 276 to lower the baffles 125 and 126 into engagement with the molds 121 and 122, and counterblowing air is thereafter supplied from the timer through lines 97 and 113 to counterblow the parisons 59 and 59a.

In finishing the parisons 59 and 59a, the forming machine is operated in substantially the same way as has been heretofore described with reference to the finishing of the blanks 56 and 56a in the press-and-blow cycle. Normally, the stretching plungers 217 will be removed from the blowheads 212a and 212b the operation of which, otherwise is the same as previously described.

When the cycle is modified by the introduction of puff blowing, the mechanism heretofore described is employed as follows:

When the parisons held in the neck rings have reached the blowing station, and prior to closing the blow molds the tips of the puff-blowing tubes 203 and 204 may be lowered into the necks of the parisons 59 and 59a by establishing pressure in the line 207a and thereby moving spool valve 275d to connect a branch of the high pressure line 277 with the line 207 for lowering the puff-tubes 203 and 204. At the lowermost position of the puff-tubes, a low pressure air line is automatically connected with the common supply pipe 209 for which air is discharged through the tubes to puff-blow the blanks. Thereafter, the timer T relieves the pressure in the line 207a whereupon the spool valve 275d is spring actuated to connect the branch of the line 277 with the line 208 which retracts the puff-tubes 203 and 204 by means of an air motor (not shown). The initial retracting movement of the puff-tubes disconnects the line 209 from its source of high pressure air and automatically terminates the puff blowing operation.

The various provisions heretofore described and their combinations have resulted in a machine which, among its other advantages, permits the manufacture of glassware having extremely uniform wall thickness and which permit substantial reduction in the weight of the glassware.

I claim:

1. In a glassware forming machine for selectively making blown and pressed and blown ware, a preform station, a preform mold and a neck ring adapted for use at said station, a carrier, a neck pin and a pressing plunger interchangeably mounted on said carrier, means for reciprocating said carrier and means for varying the stroke of the carrier selectively to move the neck pin into and out of the neck ring and the pressing plunger into the preform mold to press glass into blanks therein.

2. A forming machine for selectively making blown and pressed and blown ware comprising interchangeable pairs of preform molds, a pair of blow-molding neck pins and an interchangeable pair of press-molding plungers permanently installed mechanism for reciprocating the pairs of neck pins toward and away from a pair of the preform molds and the interchangeable pressing plungers into and out of another of the pairs of said preform molds, means for interchangeably attaching said plungers and neck pins to said mechanism, means for independently actuating said mechanism to selectively and independently form blanks and parisons in the preform molds, and means for blowing the blanks and parisons to final form.

3. A glassware forming machine comprising interchangeable pairs of preform molds and interchangeable pairs of blow molds, a pair of blow-molding neck pins and an interchangeable pair of press-molding plungers permanently installed mechanism for independently actuating the plungers and the interchangeable pins to selectively and independently form blanks and parisons in respective pairs of the preform molds, means for interchangeably attaching said pins and said plungers to said mechanism, means for selectively supplying cooling air independently to each plunger and counterblowing air independently through each neck pin, and means for blowing the blanks and parisons to final form in respective pairs of the blow molds.

4. A glassware forming machine in accordance with claim 3 and comprising means for rendering the actuating and air supplying means associated with one of a pair of said preform molds inoperative while maintaining operative the actuating and air supplying means of the other of the pair of preform molds.

5. An automatic machine for forming glassware including interchangeable multi-section preform molds and interchangeable multi-section blow molds, a pair of pivotally operable preform mold holder arms each of which supports a section of one of the interchangeable preform molds for movement to open and closed positions, a pair of pivotally operable blow mold holder arms each of which supports a section of one of the interchangeable blow molds for movement to open and closed positions, a blow mold neck pin and an interchangeable press mold plunger permanently installed actuating mechanism for reciprocating the pressing plunger and the interchangeable neck pin selectively to press a blank in one of the preform molds and form a parison in another of the preform molds, means for interchangeably attaching said pin and said plunger to said mechanism, and adjustable stop means for limiting the movement of the plunger and the neck pin.

6. A glassware forming machine in accordance with claim 5 wherein the stop means is adjustable during operation of the actuating means.

7. A feeder fed automatic glassware forming machine comprising a stationary bed having a fixed blank mold station and a fixed blow mold station, a plurality of blank molds and a like number of blow molds at said stations, means for supporting and for opening and closing said molds, a plural neck ring and transfer mechanism, a pair of blow-molding neck pins and an interchangeable pair of press-molding plungers, a reciprocating carrier operative at the blank mold station and adapted to carry interchangeable neck pins and pressing plungers, pneumatic means for reciprocating the carrier, an adjustable stop in said pneumatic means for limiting the lower position of the pins and plungers, means for manually adjusting said stop between positions suitable for a neck pin and one suitable for a pressing plunger, means effective at the blank mold station for counterblowing glass at the blank mold station, and for cooling the pressing plunger.

8. A forming machine for making hollow glassware comprising a bed, a pair of sectional blank molds designed to open and close at a blank mold station, a pair of sectional blow molds designed to open and close at a blow mold station horizontally spaced from the blank mold station, a pair of sectional neck molds associated alternately with the blank molds and blow molds, a pivoted arm for each section of said molds, a horizontal pivot for the neck mold arms and a common vertical pivot for the blank and blow mold arms extending below and closely adjacent to the horizontal pivot, means for opening and closing the molds and means for swinging the neck molds about the horizontal pivot from a position below the blank molds to a position above the blow molds.

9. A glassware forming machine in accordance with claim 8 in which the vertical pivot for the blank and blow mold arms comprises a two-part pin, the blank mold holders being mounted on one part and the blow mold holders on the other part thereof and one of said parts being removable with one pair of arms independently of the other part and pair of arms.

10. An automatic machine for forming glassware including a sectional blank mold and a sectional blow mold, a pair of pivotally operable blank mold holder arms each of which supports a section of the blank mold for movement to open and closed positions, a pair of pivotally operable blow mold holder arms each of which supports a section of the blow mold for movement to open and closed positions, all of said arms being pivoted about a common axis, a two-part pivot pin for said arms, one part being removable with one pair of holder arms independently of the other part and pair of arms.

11. An automatic machine for forming glassware including a pair of preform molds and a pair of blow molds each mold having two sections, a pair of pivotally operable preform mold holder arms each of which supports a section of each preform mold for movement to open and closed positions, a pair of pivotally operable blow mold holder arms each of which supports a section of each blow mold for movement to open and closed positions, all of said arms being pivoted about a common axis and all of said mold sections meeting in their closed positions on a common plane through said common axis, a load supporting member for each mold holder arm, said members supporting the arm approximately midway between its mold sections.

12. In an automatic machine for forming glassware, a pair of preform molds and a pair of blow molds, each mold having two sections, a pair of pivotally operable preform mold holder arms each of which supports a section of each preform mold for movement to open and closed positions, a pair of pivotally operable blow mold holder arms each of which supports a section of each blow mold for movement to open and closed positions, all of said arms being pivoted relative to each other about a common axis, one pair of said arms extending from said common axis in the opposite direction from the other pair of said arms, and means for opening and closing said molds including individual toggles for exerting closing pressure on each arm approximately midway the supported mold sections and at approximately right angles to a common mold closing line for all four molds.

13. A glassware forming machine comprising a hollow stationary bed, sectional molds thereon, two pairs of mold holder arms each carrying a section of a mold and having an air passage therethrough, a reservoir for cooling air in said bed, passages from said reservoir and having outlets in the top of said bed under the mold arms, intake openings in said mold arms in constant communication with the outlets of said passages, a valve in each of the passages, automatic means for operating said valves to open and close said passages including adjustable timing means, nozzles at the outer end of said hollow arms for directing cooling thereto on the back of the mold sections, and adjustable means for selectively directing the air from the nozzle onto the back of the mold sections in predetermined patterns, and wherein the mold holder arms are provided for associated blank and blow molds and are pivoted on a common pivot and wherein the arm for each section of said molds is associated with a separate passage from the reservoir the passage of air through which is controlled by its separate valve.

14. In a glassware forming machine an improved mold supporting, locating and operating assembly comprising blank and blow mold supporting arms mounted for pivotal movement relative to each other about a common pivot pin between open and closed mold positions on opposite sides of said pin, a passageway for cooling air through each of said arms, each of said passageways having a discharge nozzle, a mold section carried by each of said arms in constant relationship to the discharge nozzle of said arm, a source of cooling air and means for selectively applying the air to the mold section independently of the position of the section.

15. In a glassware forming machine an improved mold supporting, locating and operating assembly including blank and blow mold supporting arms mounted for pivotal movement relative to each other about a common pivot pin between open and closed mold positions on opposite sides of said pin, a passageway for cooling air through each of said arms, each of said passageways having a discharge nozzle, a mold section carried by each of said arms in constant relationship to the discharge nozzle of said arm, and an individual valve means associated with each of said arms for regulating the cooling air supplied thereto.

16. A glassware forming machine comprising means for forming a blank, a blow mold, means for transferring the blank to the blow mold, and a blow head for blowing the blank to final form, said blow head including a blank stretching and centering member having a bulbous end and of such length that when the blow head is applied to the blow mold it will contact the center of the blank and stretch the same downwardly centrally to a point adjacent to but spaced from the bottom of the mold, and blow means for expanding the blank out of contact with the member and against the walls of the blow mold.

17. A forming machine in accordance with claim 16 including means for adjusting the member relative to the blow head.

18. A glassware forming machine comprising interchangeable pairs of preform molds and interchangeable pairs of blow molds, a pair of blow-molding neck pins and an interchangeable pair of press molding plungers, permanently installed carrier mechanism for independently actuating the plungers and the interchangeable pins to selectively and independently form blanks and parisons in respective pairs of the preform molds, means for interchangeably attaching said pins and said plungers to said carrier mechanism, means for selectively supplying cooling air into the plungers and counterblowing air through the neck pins, and means for blowing the blanks and parisons to final form in respective pairs of the blow molds.

References Cited in the file of this patent

UNITED STATES PATENTS

| | | |
|---|---|---|
| 688,924 | Blair et al. | Dec. 17, 1901 |
| 1,072,553 | Winder | Sept. 9, 1913 |
| 1,632,992 | Bragg | June 21, 1927 |
| 1,633,028 | LaFrance | June 21, 1927 |
| 1,693,069 | Cramer | Nov. 27, 1928 |
| 1,785,535 | Sloan | Dec. 16, 1930 |
| 1,878,863 | LaFrance | Sept. 20, 1932 |

(Other references on following page)

UNITED STATES PATENTS

| | | |
|---|---|---|
| 1,911,119 | Ingle | May 23, 1933 |
| 1,974,841 | Allen | Sept. 25, 1934 |
| 2,018,021 | Hofman | Oct. 22, 1935 |
| 2,043,065 | Rowe | June 2, 1936 |
| 2,075,363 | Smith | Mar. 30, 1937 |
| 2,091,238 | Gordon | Aug. 24, 1937 |
| 2,123,145 | Peiler | July 5, 1938 |
| 2,161,255 | Howard | June 6, 1939 |
| 2,212,699 | Pearson | Aug. 27, 1940 |
| 2,273,777 | Berthold | Feb. 17, 1942 |
| 2,289,046 | Rowe | July 7, 1942 |
| 2,290,798 | Berthold | July 21, 1942 |
| 2,378,176 | Bert | June 12, 1945 |
| 2,402,475 | Waterbury et al. | June 18, 1946 |
| 2,442,315 | Samuelson et al. | May 25, 1948 |
| 2,466,669 | Winder | Apr. 12, 1949 |
| 2,508,890 | Rowe | May 23, 1950 |
| 2,508,891 | Rowe | May 23, 1950 |